(12) United States Patent
Kawakubo et al.

(10) Patent No.: US 10,391,839 B2
(45) Date of Patent: Aug. 27, 2019

(54) REFRIGERATION CYCLE DEVICE

(71) Applicant: DENSO CORPORATION, Kariya, Aichi-pref. (JP)

(72) Inventors: Masaaki Kawakubo, Kariya (JP); Tetsuya Itou, Kariya (JP); Satoshi Itoh, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 15 days.

(21) Appl. No.: 15/749,130

(22) PCT Filed: Jul. 20, 2016

(86) PCT No.: PCT/JP2016/071284
§ 371 (c)(1),
(2) Date: Jan. 31, 2018

(87) PCT Pub. No.: WO2017/022487
PCT Pub. Date: Feb. 9, 2017

(65) Prior Publication Data
US 2018/0222289 A1 Aug. 9, 2018

(30) Foreign Application Priority Data
Aug. 3, 2015 (JP) .................................. 2015-153377

(51) Int. Cl.
*B60H 1/32* (2006.01)
*B60H 1/00* (2006.01)
(Continued)

(52) U.S. Cl.
CPC ....... *B60H 1/3223* (2013.01); *B60H 1/00335* (2013.01); *B60H 1/00485* (2013.01);
(Continued)

(58) Field of Classification Search
CPC ...... B60H 1/3223; B60H 1/22; B60H 1/3211; B60H 1/3207; B60H 1/3204;
(Continued)

(56) References Cited

U.S. PATENT DOCUMENTS

2008/0141688 A1* 6/2008 Stanke ................ B60H 1/3204
62/149
2009/0241573 A1 10/2009 Ikegami et al.
(Continued)

FOREIGN PATENT DOCUMENTS

JP H09089416 A 4/1997
JP 2009236404 A 10/2009
(Continued)

*Primary Examiner* — Emmanuel E Duke
(74) *Attorney, Agent, or Firm* — Harness, Dickey & Pierce, P.L.C.

(57) ABSTRACT

A refrigeration cycle device includes a pre-evaporator decompression unit that decompresses refrigerant which flowed out from an exterior heat exchanger, and an evaporator passage that guides the refrigerant which flowed out from the exterior heat exchanger to a suction port of a compressor while passing through a pre-evaporator decompression unit and an evaporator. Further, the refrigeration cycle device includes a bypass passage that guides the refrigerant which flowed out from the exterior heat exchanger to the suction port of the compressor while bypassing the pre-evaporator decompression unit and the evaporator, a pre-exterior device switching unit, and a passage switching unit that opens and closes the bypass passage. Further, the pre-exterior device switching unit and the passage switching unit form a coupled valve where the pre-exterior device switching unit and the passage switching unit are mechanically coupled.

9 Claims, 16 Drawing Sheets

(51) Int. Cl.
*F16K 11/04* (2006.01)
*F25B 29/00* (2006.01)
*F25B 41/04* (2006.01)
*B60H 1/22* (2006.01)
*F16K 11/044* (2006.01)
*F16K 11/048* (2006.01)
*F16K 11/16* (2006.01)
*F25B 6/04* (2006.01)
*F25B 43/00* (2006.01)

(52) U.S. Cl.
CPC ..... *B60H 1/00885* (2013.01); *B60H 1/00921* (2013.01); *B60H 1/2218* (2013.01); *B60H 1/3213* (2013.01); *F16K 11/04* (2013.01); *F16K 11/044* (2013.01); *F16K 11/048* (2013.01); *F25B 29/003* (2013.01); *F25B 41/04* (2013.01); *F16K 11/163* (2013.01); *F25B 6/04* (2013.01); *F25B 43/006* (2013.01); *F25B 2313/02731* (2013.01); *F25B 2339/047* (2013.01)

(58) Field of Classification Search
CPC .............. B60H 1/3227; B60H 1/00921; B60H 1/2218; B60H 1/00335; B60H 1/00485; B60H 1/3213; B60H 1/00885; F16K 11/044; F16K 11/048; F16K 11/04; F16K 11/163; F25B 41/04; F25B 29/003; F25B 6/04; F25B 13/00; F25B 2313/02731; F25B 43/006; F25B 2339/047; F25D 21/004

See application file for complete search history.

(56) References Cited

U.S. PATENT DOCUMENTS

| 2013/0186131 | A1* | 7/2013 | Guitar | B60H 1/00342 62/498 |
| 2016/0075212 | A1* | 3/2016 | Morishita | F25B 41/04 165/202 |
| 2017/0350624 | A1 | 12/2017 | Kawakubo | |

FOREIGN PATENT DOCUMENTS

| JP | 4803199 B2 | 10/2011 |
| JP | 2011235753 A | 11/2011 |
| JP | 2014070867 A | 4/2014 |
| JP | 2014149123 A | 8/2014 |
| JP | 2016121858 A | 7/2016 |
| WO | WO-2014054229 A1 | 4/2014 |
| WO | WO-2017022378 A1 | 2/2017 |

* cited by examiner

REFRIGERATION CYCLE DEVICE

CROSS REFERENCE TO RELATED APPLICATIONS

This application is a U.S. National Phase Application under 35 U.S.C. 371 of International Application No. PCT/JP2016/071284 filed on Jul. 20, 2016 and published in Japanese as WO 2017/022487 A1 on Feb. 9, 2017. This application is based on and claims the benefit of priority from Japanese Patent Application No. 2015-153377 filed on Aug. 3, 2015. The entire disclosures of all of the above applications are incorporated herein by reference.

TECHNICAL FIELD

The present disclosure relates to a refrigeration cycle device which circulates a refrigerant.

BACKGROUND ART

Conventionally, for example, Patent Literature 1 describes one of this type of refrigeration cycle devices. The refrigeration cycle device described in Patent Literature 1 is configured to switch between a passage for cooling and a passage for heating in which a refrigerant circulates.

Specifically, the refrigeration cycle device disclosed by Patent Literature 1 has a condensing heat exchanger, a subcooling heat exchanger, and a liquid receiver. The condensing heat exchanger, the subcooling heat exchanger, and the liquid receiver are integrally formed with each other and are located outdoors. The refrigeration cycle device has a plurality of control valves that switch the flow passages of the refrigerant. For example, the control valves (e.g., valve mechanisms) include a bypass passage switching valve. The bypass passage switching valve is disposed in a bypass passage which guides the refrigerant to bypass the subcooling heat exchanger.

The bypass passage switching valve opens the bypass passage in a heating mode (i.e., a heating operation mode) such that the refrigerant flows out of the liquid receiver and flows to bypass the subcooling heat exchanger and an evaporator.

The liquid receiver serves as a gas-liquid separator and a liquid reservoir. In the heating mode, an accumulator, which is disposed separately from the liquid receiver, serves as the gas-liquid separator and the liquid reservoir.

PRIOR ART LITERATURES

Patent Literature

Patent Literature 1: JP 4803199 B

SUMMARY OF INVENTION

As described above, the refrigeration cycle device disclosed by Patent Literature 1 is configured to switch between the heating path and the cooling path, but requires a plurality of control valves for this switching. Further, it is necessary to switch the control valves individually. As a result of detailed considerations by the present inventors, these points were discovered.

The present disclosure addresses the above issues, thus it is an objective of the present disclosure to reduce a quantity of control valves in a refrigeration cycle device.

To achieve the above objective, according to one aspect of the present disclosure, a refrigeration cycle device includes a compressor that includes a suction port and a discharge port, the compressor sucking in refrigerant from the suction port, compresses the refrigerant, and then discharges the compressed refrigerant from the discharge port, a heat dissipater, the refrigerant which flowed out from the compressor flowing into the heat dissipater, the heat dissipater dissipating heat held by the refrigerant to ventilation air toward an air conditioning target space, an exterior heat exchanger, the refrigerant that flowed out from the compressor flowing into the exterior heat exchanger, the exterior heat exchanger exchanging heat between the refrigerant and outside air, a pre-exterior device switching unit disposed in a refrigerant passage from the compressor to the exterior heat exchanger, the pre-exterior device switching unit being switched between an opening side switching state that guides the refrigerant to flow from the compressor to the exterior heat exchanger, and a decompression side switching state that guides the refrigerant to flow from the compressor to the heat dissipater and guides the refrigerant, which is decompressed to a greater degree than in the open side switching state after flowing out from the heat dissipater, to flow to the exterior heat exchanger, a pre-evaporator decompression unit that decompresses the refrigerant which flowed out from the exterior heat exchanger, an evaporator that exchanges heat between the refrigerant which flowed out from the pre-evaporator decompression unit and the ventilation air to evaporate the refrigerant, an evaporator passage that guides the refrigerant which flowed out from the exterior heat exchanger to the suction port of the compressor while passing through the pre-evaporator decompression unit and the evaporator, a bypass passage that guides the refrigerant which flowed out from the exterior heat exchanger to the suction port of the compressor while bypassing the pre-evaporator decompression unit and the evaporator, a passage switching unit that opens and closes the bypass passage, the passage switching unit being set in a non-bypass state that closes the bypass passage while the evaporator passage is open, and being set in a bypass state that opens the bypass passage while the evaporator passage is closed, where the pre-exterior device switching unit and the passage switching unit form a coupled valve where the pre-exterior device switching unit and the passage switching unit are mechanically coupled, and in the coupled valve, the passage switching unit is set in the non-bypass state together with the pre-exterior device switching unit being switched to the opening side switching state, and the passage switching unit is set in the bypass state together with the pre-exterior device switching unit being switched to the decompression side switching state.

According to the above disclosure, the pre-exterior device switching unit and the passage switching unit form the coupled valve where the pre-exterior device switching unit and the passage switching unit are mechanically coupled. Further, in the coupled valve the passage switching unit is set in the non-bypass state together with the pre-exterior device switching unit being switched to the opening side switching state, and the passage switching unit is set in the bypass state together with the pre-exterior device switching unit being switched to the decompression side switching state. Accordingly, as compared to a case where the pre-exterior device switching unit and the passage switching unit are formed as separate control valves, the number of control valves in the refrigeration cycle device may be reduced. For example, as compared to the refrigeration cycle device of Patent Literature 1, the number of control valves may be reduced.

Further, according to another aspect of the present disclosure, a refrigeration cycle device includes a compressor that includes a suction port and a discharge port, the compressor sucking in refrigerant from the suction port, compresses the refrigerant, and then discharges the compressed refrigerant from the discharge port, a heat dissipater, the refrigerant which flowed out from the compressor flowing into the heat dissipater, the heat dissipater dissipating heat held by the refrigerant to ventilation air toward an air conditioning target space, an exterior heat exchanger, the refrigerant that flowed out from the compressor flowing into the exterior heat exchanger, the exterior heat exchanger exchanging heat between the refrigerant and outside air, a pre-exterior device switching unit disposed in a refrigerant passage from the compressor to the exterior heat exchanger, the pre-exterior device switching unit being switched between an opening side switching state that guides the refrigerant to flow from the compressor to the exterior heat exchanger, and a decompression side switching state that guides the refrigerant to flow from the compressor to the heat dissipater and guides the refrigerant, which is decompressed to a greater degree than in the open side switching state after flowing out from the heat dissipater, to flow to the exterior heat exchanger, a pre-evaporator decompression unit that decompresses the refrigerant which flowed out from the exterior heat exchanger, an evaporator that exchanges heat between the refrigerant which flowed out from the pre-evaporator decompression unit and the ventilation air to evaporate the refrigerant, an evaporator passage that guides the refrigerant which flowed out from the exterior heat exchanger to the suction port of the compressor while passing through the pre-evaporator decompression unit and the evaporator, a bypass passage that guides the refrigerant which flowed out from the exterior heat exchanger to the suction port of the compressor while bypassing the pre-evaporator decompression unit and the evaporator, a passage switching unit that opens and closes the bypass passage, the passage switching unit being switched between a non-bypass state that closes the bypass passage and a bypass state that opens the bypass passage, and an opening/closing valve that opens and closes the evaporator passage, where the pre-exterior device switching unit and the passage switching unit form a coupled valve where the pre-exterior device switching unit and the passage switching unit are mechanically coupled, and in the coupled valve, the passage switching unit is set in the non-bypass state together with the pre-exterior device switching unit being switched to the opening side switching state, and the passage switching unit is set in the bypass state together with the pre-exterior device switching unit being switched to the decompression side switching state.

In this regard as well, as compared to a case where the pre-exterior device switching unit and the passage switching unit are formed as separate control valves, the number of control valves in the refrigeration cycle device may be reduced.

DESCRIPTION OF EMBODIMENTS

Embodiments of the present disclosure will be described hereafter referring to drawings. In the embodiments, a part that corresponds to or equivalents to a matter described in a preceding embodiment may be assigned with the same reference number.

First Embodiment

Figure 1:
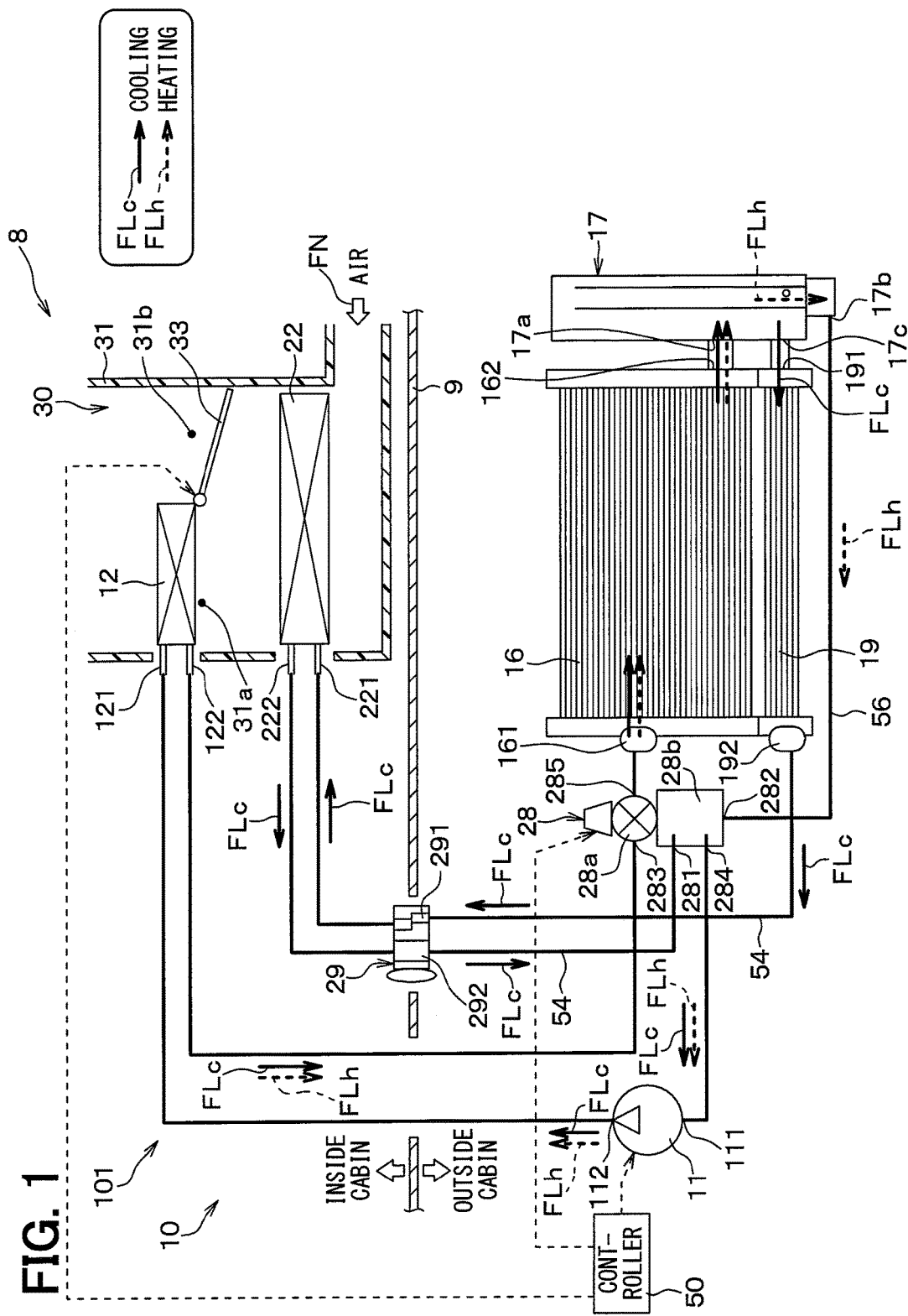
FIG. 1 is an overview configuration diagram which schematically illustrates a vehicle air conditioner according to a first embodiment.

FIG. 1 schematically illustrates the entire configuration of a vehicle air conditioner 8 according to the present embodiment. The vehicle air conditioner 8 has a vapor-compression refrigeration cycle device 10 having a heat pump circuit 101 in which a refrigerant circulates. The refrigeration cycle device 10 switches between a cooling mode (i.e., a first mode) that cools a vehicle cabin by cooling ventilation air blown into the vehicle cabin and a heating mode (i.e., a second mode) that heats the vehicle cabin by heating the ventilation air.

The vehicle air conditioner 8 shown in FIG. 1 is mounted to a hybrid vehicle that uses power generated by an internal combustion engine (i.e., an engine) and an electric motor. The refrigeration cycle device 10 is mounted to the vehicle air conditioner 8 such that the refrigeration cycle device 10 heats and cools air which is blown into the vehicle cabin. The vehicle cabin is an air conditioning target space.

The heat pump circuit 101 of the refrigeration cycle device 10 is a fluid circulation circuit in which a fluid, e.g., a refrigerant, flows. As shown in FIG. 1, the heat pump circuit 101 is configured to switch between a cooling mode refrigerant circuit that circulates refrigerant as shown by the arrows FLc, and a heating mode refrigerant circuit that circulates refrigerant as shown by the arrows FLh.

The refrigerant circulating in the heat pump circuit 101 is HFC refrigerant (specifically, R134a), and the heat pump circuit 101 forms a subcritical refrigeration cycle in which a temperature of a high-pressure side refrigerant does not exceed a critical pressure of the refrigerant. Of course, HFO refrigerant (e.g., R1234yh), etc. may be used as the refrigerant instead.

The refrigeration cycle device 10 has an electronic control unit (ECU) 50 and the heat pump circuit 101. The heat pump circuit 101 has a compressor 11, a interior condenser 12, an exterior heat exchanger 16, a gas-liquid separator 17, a subcooling device 19, an evaporator 22, an integrated valve 28, a thermal expansion valve 29, an evaporator passage 54, a bypass passage 56, and various sensors which are not illustrated.

The compressor 11 has a suction port 111 and a discharge port 112 and is housed in an engine room. The engine room is located outside the vehicle cabin and is partitioned from the vehicle cabin by an engine room partition wall 9 of the vehicle on which the vehicle air conditioner 8 is mounted.

The compressor 11 draws the refrigerant from the heat pump circuit 101 through the suction port 111, compresses the refrigerant to be a superheated refrigerant, and discharges the superheated refrigerant from the discharge port 112. A refrigerant inlet 121 of the interior condenser 12 is connected to the discharge port 112 of the compressor 11. In the present embodiment, the compressor 11 is an electric compressor. A variety of types compression mechanisms may be used for the compressor 11. For example, the compression mechanism of the compressor 11 may be a scroll compression mechanism, or a vane compression mechanism.

The compressor 11 is operated by an electric motor. An operation (i.e., a rotational speed) of the electric motor is controlled by a control signal output from the ECU 50. The electric motor may be an AC motor or a DC motor. A refrigerant discharge capacity of the compressor 11 is controlled by controlling the rotational speed of the electric motor.

The high temperature and high pressure refrigerant flowing out of the compressor 11 flows into the interior condenser 12, and the interior condenser 12 dissipates the heat held by that high temperature and high pressure refrigerant into ventilation air blown into the vehicle cabin. In other words, the interior condenser 12 is a heat dissipater that dissipates heat from the refrigerant.

Specifically, the interior condenser 12 is disposed within a housing 31 of an interior air conditioning unit 30. The interior condenser 12 exchanges heat between the refrigerant inside the interior condenser 12 and the ventilation air passing through the interior condenser 12, thereby condensing the refrigerant as well as heating the ventilation air.

The interior condenser 12 discharges the refrigerant from a refrigerant outlet 122 of the interior condenser 12. The refrigerant outlet 122 of the interior condenser 12 is connected to a third inlet passage 283 of the integrated valve 28.

The integrated valve 28 is a coupled valve of a plurality of valve bodies which are mechanically coupled to each to operate, i.e., a composite control valve. The integrated valve 28 is operated according to a control signal output from the ECU 50, and due to the operation of the integrated valve 28, the heating mode and cooling mode of the refrigeration cycle device 10 are switched. In other words, the heating mode and cooling mode of the heat pump circuit 101 are switched.

Specifically, the integrated valve 28 functionally includes a pre-exterior device switching unit 28a and a passage switching unit 28b. The pre-exterior device switching unit 28a switches the refrigerant pressure of refrigerant flowing into the exterior heat exchanger 16. The passage switching unit 28b switches the refrigerant passage connected to the suction port 111 of the compressor 11. In the present embodiment, the pre-exterior device switching unit 28a is disposed in a refrigerant passage from the discharge port 112 of the compressor 11 to a refrigerant inlet of the exterior heat exchanger 16. Further, the passage switching unit 28b is disposed in a refrigerant passage from the suction port 111 of the compressor 11 to each of a thermosensitive unit 292 of the thermal expansion valve 29 and a gas-phase refrigerant outlet 17b of the gas-liquid separator 17.

Figure 2:
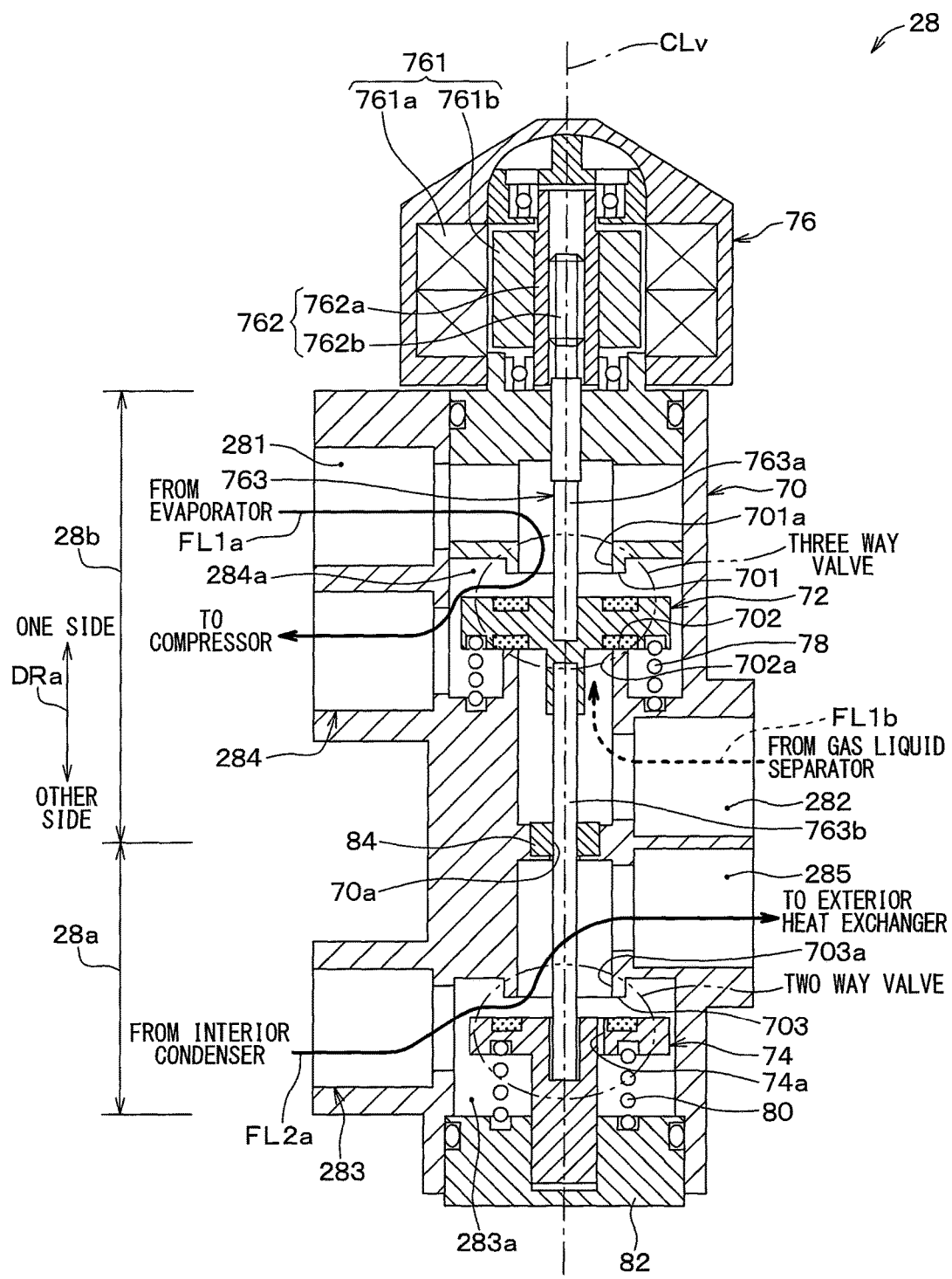
FIG. 2 is a cross sectional view of an integrated valve unit in the first embodiment, and illustrates the internal configuration of an integrated valve 28 during a cooling mode.

The integrated valve 28 forms a part of the heat pump circuit 101. The integrated valve 28 has a body 70. As shown in FIG. 2, the body 70 has a first inlet passage 281, a second inlet passage 282, and a third inlet passage 283 from which the refrigerant flows into the body 70. The body 70 further has a first outlet passage 284 and a second outlet passage 285 from which the refrigerant flows out of the body 70. FIG. 2 is a cross-sectional view illustrating an inside of the integrated valve 28. FIG. 2 shows the integrated valve 28 in the cooling mode. The pre-exterior device switching unit 28a and the passage switching unit 28b of the integrated valve 28 are functional portions and may not be clearly delineated from each other mechanically.

In the integrated valve 28, the first inlet passage 281 and the second inlet passage 282 serve as inlet passages of the passage switching unit 28b, and the first outlet passage 284 serves an outlet passage of the passage switching unit 28b. The third inlet passage 283 serves as an inlet passage of the pre-exterior device switching unit 28a, and the second outlet passage 285 serves as an outlet passage of the pre-exterior device switching unit 28a.

As shown in FIG. 1, the first inlet passage 281 of the integrated valve 28 is connected to the evaporator 22 through a thermosensitive unit 292 of the thermal expansion valve 29. The second inlet passage 282 is connected to the gas-phase refrigerant outlet 17b of the gas-liquid separator 17. The third inlet passage 283 is connected to the refrigerant outlet 122 of the interior condenser 12. The first outlet passage 284 is connected to the suction port 111 of the compressor 11. The second outlet passage 285 is connected to a refrigerant inlet 161 of the exterior heat exchanger 16. The detailed configuration of the integrated valve 28 will be described later.

The exterior heat exchanger 16 is located on a front area inside the engine room and includes the refrigerant inlet 161 and a refrigerant outlet 162. The refrigerant flowing out of the compressor 11 flows into the refrigerant inlet 161 of the exterior heat exchanger 16 through the interior condenser 12 and the pre-exterior device switching unit 28a of the integrated valve 28. Then, the exterior heat exchanger 16 performs a heat exchange between the refrigerant, which flowed in, and an outside air, which is drawn from an outside of the vehicle cabin by a blower fan (not shown).

The exterior heat exchanger 16 serves as an exterior evaporator and an exterior condenser depending on a temperature of the refrigerant flowing into the exterior heat exchanger 16. The pre-exterior device switching unit 28a of the integrated valve 28 switches the exterior heat exchanger 16 between serving as the evaporator and serving as the condenser. The refrigerant after exchanging heat in the exterior heat exchanger 16 flows to a refrigerant inlet 17a of the gas-liquid separator 17. The above-described blower fan is an electric blower, and a rotational speed of the blower fan (i.e., a ventilation capacity corresponding to that rotational speed) is controlled by a control voltage output from the ECU 50.

The gas-liquid separator 17 has the refrigerant inlet 17a, a gas-phase refrigerant outlet 17b, and a liquid-phase refrigerant outlet 17c. The refrigerant flowing out of the refrigerant outlet 162 of the exterior heat exchanger 16 flows into the refrigerant inlet 17a of the gas-liquid separator 17. The gas-liquid separator 17, according to well-known gas-liquid separating configurations, separates the refrigerant, which flows into the gas-liquid separator 17, into a gas-phase refrigerant and a liquid-phase refrigerant. The gas-liquid separator 17 is configured to discharge the gas-phase refrigerant from the gas-phase refrigerant outlet 17b and discharge the liquid-phase refrigerant from the liquid-phase refrigerant outlet 17c. Further, the gas-liquid separator 17 also functions as a liquid reservoir that accumulates liquid phase refrigerant within the gas-liquid separator 17.

For example, the second inlet passage 282 of the integrated valve 28 is connected to the gas-phase refrigerant outlet 17b of the gas-liquid separator 17, and the second outlet passage 285 of the integrated valve 28 is connected to the refrigerant inlet 161 of the exterior heat exchanger 16. Accordingly, the second inlet passage 282 communicates with the second outlet passage 285 through the exterior heat exchanger 16 and the gas-liquid separator 17. For this reason, a pressure of the refrigerant in the second inlet passage 282 is substantially equal to a pressure of the refrigerant in the second outlet passage 285. In other words, a pressure of the refrigerant which flows into the second inlet passage 282 of the integrated valve 28 is closer to a pressure of the refrigerant in the second outlet passage 285 as compared to a pressure of the refrigerant flowing into the first inlet passage 281.

The subcooling device 19 has a refrigerant inlet 191 and a refrigerant outlet 192. The refrigerant inlet 191 is connected to the liquid-phase refrigerant outlet 17c of the gas-liquid separator 17. The subcooling device 19 is located between the liquid-phase refrigerant outlet 17c of the gas-liquid separator 17 and a pre-evaporator decompression unit 291 of the thermal expansion valve 29.

The subcooling device 19 performs a heat exchange between the refrigerant flowing from the liquid-phase refrigerant outlet 17c and the outside air so as to increase a subcooling degree of the liquid-phase refrigerant by cooling the liquid-phase refrigerant, and then discharges the refrigerant, which has exchanged heat with the outside air, from the refrigerant outlet 192 to the pre-evaporator decompression unit 291 of the thermal expansion valve 29. That is, the subcooling device 19 is a heat exchanger that subcools the refrigerant flowing from the liquid-phase refrigerant outlet 17c of the gas-liquid separator 17. The subcooling device 19, the exterior heat exchanger 16, and the gas-liquid separator 17 are coupled integrally with each other by bolting.

The thermal expansion valve 29 is a conventional thermosensitive mechanical expansion valve that has a mechanical mechanism that decompresses and expands the refrigerant flowing into a refrigerant inlet 221 of the evaporator 22 such that a superheat degree of the refrigerant on an outlet side of the evaporator 22, i.e., the refrigerant flowing out of a refrigerant outlet 222 of the evaporator 22, is kept within a predetermined specified range. In other words, the thermal expansion valve 29 adjusts the superheat degree of the refrigerant in the refrigerant outlet 222 of the evaporator 22. The thermal expansion valve 29 is commonly used in a vehicle air conditioner and is not necessary to be controlled by the ECU 50 since the thermal expansion valve 29 is a mechanical valve, and therefore may be provided at low cost and flexible mountability.

Specifically, the thermal expansion valve 29 has the pre-evaporator decompression unit 291 and the thermosensitive unit 292. The pre-evaporator decompression unit 291 is located between the refrigerant outlet 192 of the subcooling device 19 and the refrigerant inlet 221 of the evaporator 22. The thermosensitive unit 292 is located between the refrigerant outlet 222 of the evaporator 22 and the first inlet passage 281 of the integrated valve 28. The thermosensitive unit 292 detects the superheat degree of the refrigerant based on a temperature and a pressure of the refrigerant in the refrigerant outlet 222 of the evaporator 22. The pre-evaporator decompression unit 291 regulates an opening degree of a choke of the flowing refrigerant depending on the temperature and the pressure of the refrigerant on the evaporator outlet side, and decompresses the refrigerant flowing out of the exterior heat exchanger 16 and passing through the gas-liquid separator 17 and the subcooling device 19. In other words, the thermal expansion valve 29 decompresses and expands the refrigerant, which flows from the liquid-phase refrigerant outlet 17c of the gas-liquid separator 17 into the thermal expansion valve 29 through the subcooling device 19, in the pre-evaporator decompression unit 291.

The evaporator 22 has the refrigerant inlet 221 and the refrigerant outlet 222. The refrigerant flows into the evaporator 22 from the refrigerant inlet 221 and flows out of the evaporator 22 from the refrigerant outlet 222. The evaporator 22 is located on a upstream side of the interior condenser 12 in a flow direction of air flowing in the housing 31 of the interior air conditioning unit 30. The evaporator 22 is a cooling heat exchanger that cools the air in the cooling mode. The evaporator 22 evaporates the refrigerant, which flows from the pre-evaporator decompression unit 291 of the thermal expansion valve 29, by exchanging heat with the refrigerant and the air flowing in the housing 31. The interior air conditioning unit 30 has a blower located on an upstream side of the evaporator 22. The blower blows the air to the evaporator 22 as shown by an arrow FN.

The evaporator passage 54 and the bypass passage 56 are refrigerant passages disposed between from the exterior heat exchanger 16 to the suction port 111 of the compressor 11 and are arranged parallel to each other. In other words, the evaporator passage 54 is a refrigerant passage that allows the refrigerant flowing out of the exterior heat exchanger 16 to flow into the suction port 111 of the compressor 11 via the pre-evaporator decompression unit 291 of the thermal expansion valve 29 and the evaporator 22. Further, the bypass passage 56 is a refrigerant passage that allows the refrigerant flowing out of the exterior heat exchanger 16 to flow into the suction port 111 of the compressor 11 while bypassing the pre-evaporator decompression unit 291 of the thermal expansion valve 29 and the evaporator 22.

Accordingly, the subcooling device 19, the evaporator 22, and the pre-evaporator decompression unit 291 and the thermosensitive unit 292 of the thermal expansion valve 29 are disposed in the evaporator passage 54. Further, the refrigerant flow upstream side of the evaporator passage 54 is connected to the liquid-phase refrigerant outlet 17c of the gas-liquid separator 17, and the refrigerant flow downstream side of the evaporator passage 54 is connected to the first inlet passage 281 of the integrated valve 28.

Further, the refrigerant flow upstream side of the bypass passage 56 is connected to the gas-phase refrigerant outlet 17b of the gas-liquid separator 17, and the refrigerant flow downstream side of the bypass passage 56 is connected to the second inlet passage 282 of the integrated valve 28.

As understood from these connection relationships, the gas-liquid separator 17 is interposed between the exterior heat exchanger 16 and the evaporator passage 54 and the bypass passage 56. Further, the gas-liquid separator 17 discharges gas-phase refrigerant from the gas-phase refrigerant outlet 17b to the bypass passage 56, and discharges liquid-phase refrigerant from the liquid-phase refrigerant outlet 17c to the evaporator passage 54.

The interior air conditioning unit 30 further has an air passage switching door 33 in addition to the housing 31. The housing 31 defines the warm air passage 31a and a cool air passage 31b therein. The warm air passage 31a and the cool air passage 31b are arranged in parallel to each other. The interior condenser 12 is located in the warm air passage 31a. That is, the warm air passage 31a is an air passage that guides the air, which flows into the warm air passage 31a after passing through the evaporator 22, to the interior condenser 12. The cool air passage 31b is an air passage guides the air to flow bypassing the interior condenser 12.

The air passage switching door 33 is operated based on a control signal output from the ECU 50. The air passage switching door 33 is positioned at a first door position and a second door position. The air passage switching door 33 closes the warm air passage 31a and opens the cool air passage 31b when being positioned at the first door position. The air passage switching door 33 opens the warm air passage 31a and closes the cool air passage 31b when being positioned at the second door position. Specifically, the air passage switching door 33 is positioned at the first door position in the cooling mode and is positioned at the second door position in the heating mode. For example, the air passage switching door 33 is positioned at the second door position in FIG. 1.

The housing 31 is provided with openings that are located on a downstream side of the warm air passage 31a and the cool air passage 31b. The air (i.e., a conditioned air) after passing through the warm air passage 31a and/or the cool air passage 31b is blown from the openings into the vehicle cabin. The vehicle cabin is the air conditioning target space. The openings include a face opening from which the conditioned air is blown toward an upper body of a passenger, a foot opening from which the conditioned air is blown toward foot of the passenger, and a defroster opening from which the conditioned air is blown toward an inner surface of a windshield. A switching door is arranged in each opening to open and close the opening.

Figure 3:
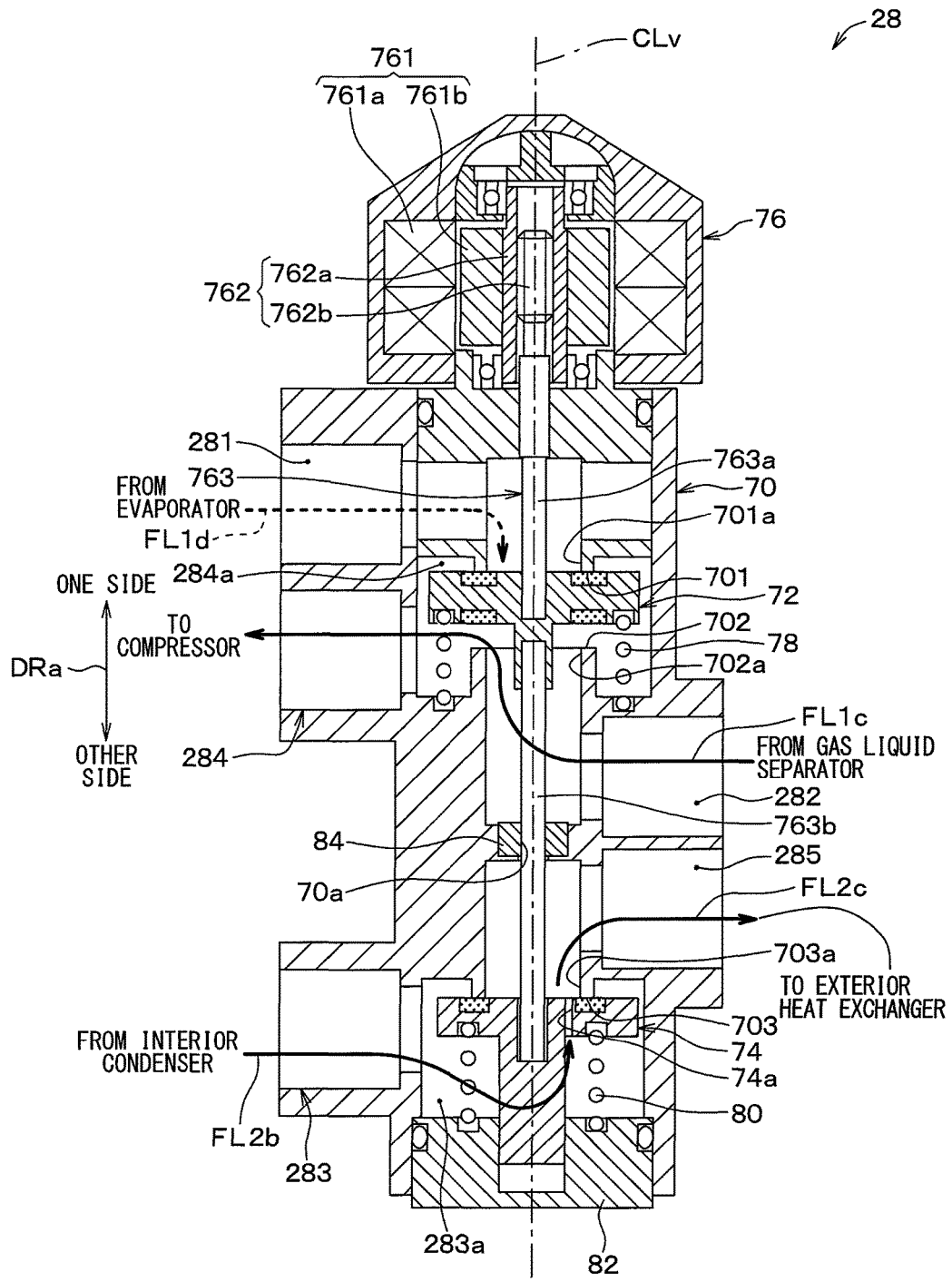
FIG. 3 is a cross sectional view of an integrated valve unit in the first embodiment, and illustrates the internal configuration of an integrated valve during a cooling mode.

As shown in FIG. 2 and FIG. 3, the integrated valve 28 has the body 70, a first valve member 72, a second valve member 74, a valve driving member 76, a first bias member 78, a second bias member 80, an adjusting screw 82, and a sealing member 84. The body 70 houses the first valve member 72, the second valve member 74, the first bias member 78, and the second bias member 80, and the sealing member 84. FIG. 3 is a cross-sectional view illustrating the inside of the integrated valve 28 similar to FIG. 2 and is different from FIG. 2 in a point that the integrated valve 28 is in the heating mode in FIG. 3.

The integrated valve 28 has a valve moving axis CLv as an axis, and the first valve member 72 and the second valve member 74 are arranged in series along the valve moving axis CLv. The valve driving member 76 has an actuator 761. The first valve member 72 and the second valve member 74 are moved by the actuator 761 to move in an axial direction DRa of the valve moving axis CLv integrally with each other. The axial direction DRa will be referred to as a valve moving axial direction DRa hereafter.

Specifically, the body 70 has a first valve seat 701, a second valve seat 702, and a third valve seat 703 therein. The first valve seat 701 therein has a passage communication hole 701a that communicates with the first inlet passage 281. The second valve seat 702 therein has a passage communication hole 702a that communicates with the second inlet passage 282. The third valve seat 703 therein has a passage communication hole 703a that communicates with the second outlet passage 285. The third valve seat 703 serves as a valve seat of the present disclosure.

The first valve member 72 is located between the first valve seat 701 and the second valve seat 702 in the valve moving axial direction DRa. Specifically, the first valve seat 701 is located on a side of the first valve member 72 adjacent to the actuator 761 in the valve moving axial direction DRa. In other words, the first valve seat 701 is located on one side of the first valve member 72 in the valve moving axial direction DRa. The second valve seat 702 is located on an other side of the first valve member 72 in the valve moving axial direction.

The first outlet passage 284 has a first valve chamber 284a. The first valve chamber 284a is a part of the first outlet passage 284 and defined as a connection area where the first valve seat 701 and the second valve seat 702 are located. The first valve chamber 284a houses the first valve member 72 and the first bias member 78.

The third valve seat 703 is located on a side of the second valve member 74 adjacent to the actuator 761 in the valve moving axial direction DRa. In other words, the third valve seat 703 is located on one side of the second valve member 74 in the valve moving axial direction DRa. The third inlet passage 283 has a second valve chamber 283a. The second valve chamber 283a is a part of the third inlet passage 283 and defined as a connection area where the third valve seat 703 is located. The second valve chamber 283a houses the second valve member 74 and the second bias member 80.

The first valve member 72 has a substantially disc shape, and a thickness direction thereof is parallel to the valve moving axial direction DRa. The first valve member 72 serves as a valve body of the passage switching unit 28b. The first valve member 72 closes the first inlet passage 281 when being pressed against the first valve seat 701 in the valve moving axial direction DRa. On the other hand, the first valve member 72 closes the second inlet passage 282 when being pressed against the second valve seat 702 in the valve moving axial direction.

That is, by moving in the valve moving axial direction DRa, the first valve member 72 selectively switches between a first communication state and a second communication state. In the first communication state, the first inlet passage 281 and the first outlet passage 284 communicate with each other and the second inlet passage 282 is closed. In the second communication state, the second inlet passage 282 and the first outlet passage 284 communicate with each other and the first inlet passage 281 is closed.

The first valve member 72 shown in FIG. 2 is in the first communication state. In the first communication state, the first valve member 72 is distanced from the first valve seat 701 and pressed against the second valve seat 702 to abut on the second valve seat 702. Accordingly, the first valve member 72 guides the refrigerant to flow from the first inlet passage 281 to the first outlet passage 284 as shown by arrow FL1a. At the same time, the first valve member 72 shuts off a flow of the refrigerant flowing into the second inlet passage 282 shown by arrow FL1b.

The first valve member 72 shown in FIG. 3 is in the second communication state. In the second communication state, the first valve member 72 is separated from the second valve seat 702 and pressed against the first valve seat 701 to abut on the first valve seat 701. Accordingly, the first valve member 72 guides the refrigerant to flow from the second inlet passage 282 to the first outlet passage 284 as shown by arrow FL1c. At the same time, the first valve member 72 shuts off a flow of the refrigerant flowing into the first inlet passage 281 shown by arrow FL1d.

Due to the first valve member 72 operating in this manner, the passage switching unit 28b of the integrated valve 28 functions as a three way valve. In other words, due to the operation of the first valve member 72, the passage switching unit 28b opens and closes the bypass passage 56 connected to the second inlet passage 282, and opens and closes the evaporator passage 54 connected to the first inlet passage 281.

More specifically, due to the first valve member 72 switching to the first communication state, the passage switching unit 28b is set in a non-bypass state that closes the bypass passage 56 when opening the evaporator passage 54 shown in FIG. 1. In other words, the passage switching unit 28b closes the bypass passage 56 and opens the evaporator passage 54 in the non-bypass state. Conversely, due to the first valve member 72 switching to the second communication state, the passage switching unit 28b is set in a bypass state that opens the bypass passage 56 when closing the evaporator passage 54. In other words, the passage switching unit 28b opens the bypass passage 56 and closes the evaporator passage 54 in the bypass state. In this regard, the passage switching unit 28b may be selectively switched between the non-bypass state and the bypass state.

As shown in FIG. 2 and FIG. 3, the second valve member 74 has a substantially disc shape with a thickness direction in the valve moving axial direction DRa. The second valve member 74 serves as a valve body of the pre-exterior device switching unit 28a. The second valve member 74 moves as a valve body of a two-way valve.

The second valve member 74 is located on a side opposite to the actuator 761 with respect to the first valve member 72 in the valve moving axial direction DRa. The second valve member 74 has a throttle hole 74a that penetrates through the second valve member 74 in the valve moving axial direction DRa. The throttle hole 74a is a narrow through-hole and compresses the refrigerant passing through the throttle hole 74a.

The throttle hole 74a of the second valve member 74 communicates with the passage communication hole 703a of the third valve seat 703 when the second valve member 74 abuts on the third valve seat 703. Specifically, the throttle hole 74a has an opening end that is located adjacent to the third valve seat 703. The opening end of the throttle hole 74a is located on an inner side of the third valve seat 703 in a radial direction perpendicular to the valve moving axis CLv.

According to the above-described configuration, due to the second valve member 74 being moved in the valve moving axial direction DRa, the second valve member 74 selectively switches between an opening state and a throttle state. In the opening state, the second valve member 74 guides the refrigerant to flow from the third inlet passage 283 to the second outlet passage 285 mostly without compressing the refrigerant. In the throttle state, the second valve member 74 guides the refrigerant to flow from the third inlet passage 283 to the second outlet passage 285 while compressing the refrigerant to a greater degree as compared to the opening state.

The second valve member 74 is shown in the opening state in FIG. 2. In the opening state, the second valve member 74 is separated from the third valve seat 703, whereby the passage communication hole 703a of the third valve seat 703 is open and communicates with the third inlet passage 283. At this time, for example, an opening degree of the passage communication hole 703a is maximized. As a result, the second valve member 74 guides the refrigerant to flow from the third inlet passage 283 to the second outlet passage 285 as shown by arrow FL2a mostly without decompressing the refrigerant.

The second valve member 74 is shown in the throttle state in FIG. 3. In the throttle state, the second valve member 74 is pressed against the third valve seat 703 to abut on the third valve seat 703, whereby the passage communication hole 703a of the third valve seat 703 communicates with the third inlet passage 283 through the throttle hole 74a of the second valve member 74. In other words, in the throttle state, the throttle hole 74a of the second valve member 74 connects the third inlet passage 283 and the passage communication hole 703a of the third valve seat 703 such that the passage communication hole 703a communicates with the third inlet passage 283. In the throttle state, the second valve member 74 compresses the refrigerant flowing from the third inlet passage 283 to a greater degree as compared to the opening state by guiding the refrigerant to pass through the throttle hole 74a. Accordingly, the refrigerant, which flows as shown by arrow FL2b and arrow FL2c and passes through the throttle hole 74a, is decompressed and expanded by the throttle hole 74a. That is, the second valve member 74 serves as a fixed throttle. Thus, the subcooling degree of the refrigerant in the refrigerant outlet 122 of the interior condenser 12 is determined according to the opening degree of the throttle hole 74a.

Due to second valve member 74 operating in this manner, the pre-exterior device switching unit 28a of the integrated valve 28 is switched between an opening side switching state and a decompression side switching state according to the operation of the second valve member 74. The opening side switching state refers to a state in which the pre-exterior device switching unit 28a allows refrigerant to flow from the compressor 11 to the exterior heat exchanger 16 almost without being decompressed. Further, the decompression side switching state refers to a state in which the pre-exterior device switching unit 28a allows refrigerant to flow from the compressor 11 to the interior condenser 12, and allows the refrigerant after flowing out from the interior condenser 12 to flow into the exterior heat exchanger 16 while being decompressed to a greater degree as compared to the opening side switching state.

Further, the pre-exterior device switching unit 28a is set in the opening side switching state due to the second valve member 74 being switched to the opening state. Conversely, the pre-exterior device switching unit 28a is set in the decompression side switching state due to the second valve member 74 being switched to the throttle state.

As shown in FIG. 2 and FIG. 3, the first bias member 78 is a compression coil spring that is normally compressed in the valve moving axial direction DRa. The first valve member 72 is located between the first bias member 78 and the first valve seat 701 in the valve moving axial direction DRa. Accordingly, the first bias member 78 biases the first valve member 72 toward the first valve seat 701, i.e., toward the one side of the first valve member 72, in the valve moving axial direction DRa.

The second bias member 80 is a compression coil spring that is normally compressed in the valve moving axial direction DRa. The second valve member 74 is located between the second bias member 80 and the third valve seat 703 in the valve moving axial direction DRa. Accordingly, the second bias member 80 biases the second valve member 74 toward the third valve seat 703, i.e., toward the one side of the second valve member 74, in the valve moving axial direction DRa.

The adjusting screw 82 is a screw member that rotates about the valve moving axis CLv. The adjusting screw 82 is threaded into the body 70. The second bias member 80 is located between the adjusting screw 82 and the second valve member 74 in the valve moving axial direction DRa. The second bias member 80 has an end and an other end facing each other in the valve moving axial direction DRa. The one end abuts on the second valve member 74, and the other end abuts on the adjusting screw 82. Therefore, a bias force that is applied to the second valve member 74 by the second bias member 80, i.e., a spring force generated by the second bias member 80, may be increased and decreased depending on an threaded amount of the adjusting screw 82 threaded into the body 70.

The valve driving member 76 has the actuator 761, a feed screw mechanism 762, and a driving shaft 763. The actuator 761 moves the first valve member 72 and the second valve member 74 in the valve moving axial direction DRa.

The actuator 761 is an electric motor such as a stepping motor of which rotational axis coincides with the valve moving axis CLv. The actuator 761 has a stator 761a and a rotor 761b. The stator 761a includes an electromagnetic coil and is fixed to the body 70. The rotor 761b includes a permanent magnet. The rotor 761b is located on an inner side of the stator 761a in a radial direction of the stator 761a and is rotatable with respect to the stator 761a.

The feed screw mechanism 762 rotates about a rotational axis that coincides with the valve moving axis CLv. The feed screw mechanism 762 is located on an inner side of the rotor 761b in the radial direction. The feed screw mechanism 762 converts a rotation of the actuator 761, which rotates about the valve moving axis CLv, into a movement of the feed screw mechanism 762, which moves in the valve moving direction DRa. The feed screw mechanism 762 has a female screw 762a and a male screw 762b to perform the conversion.

The female screw 762a of the feed screw mechanism 762 is fixed to an inner surface of the rotor 761b, thereby rotating about the valve moving axis CLv integrally with the rotor 761b. That is, the actuator 761 rotates the feed screw mechanism 762 about the valve moving axis CLv.

The male screw 762b is threaded into the female screw 762a and is configured not to be rotatable with respect to the body 70 through the driving shaft 763. Accordingly, the male screw 762b moves in the valve moving axial direction DRa when the actuator 761 rotates the female screw 762a.

The driving shaft 763 is connected to the feed screw mechanism 762 and transmits a displacement of the feed screw mechanism 762 in the valve moving axial direction DRa to the first valve member 72 and the second valve member 74. The driving shaft 763 has a first rod 763a and a second rod 763b having an elongated shape to perform the transmission. In other words, the driving shaft 763 is a rod member coupled to each of the first valve member 72 and the second valve member 74.

The first rod 763a and the second rod 763b are located coaxially about the valve moving axis CLv and are located in series in the valve moving axis CLv. The first rod 763a is located between the male screw 762b of the feed screw mechanism 762 and the first valve member 72 in the valve moving axial direction DRa. The first rod 763a is configured to move in the valve moving axial direction DRa and is not rotatable with respect to the body 70. The first rod 763a has one end and an other end in the valve moving axial direction DRa. The one end is fixed to the male screw 762b of the feed screw mechanism 762, and the other end abuts on the first valve member 72.

The second rod 763b is located between the first valve member 72 and the second valve member 74 in the valve moving axial direction DRa. Further, the second rod 763b is inserted into an insert hole 70a formed in the body 70. In other words, a part of the second rod 763b is located inside the insert hole 70a. The insert hole 70a of the body 70 is a through-hole extending in the valve moving axial direction DRa between the second inlet passage 282 and the second outlet passage 285, which are arranged in the valve moving axial direction. The insert hole 70a mounts the sealing member 84 that blocks a flow of the refrigerant.

The second rod 763b has one end fixed to the first valve member 72, and another end that abuts on the second valve member 74. In other words, the second rod 763b is coupled to each of the first valve member 72 and the second valve member 74. Accordingly, in the integrated valve 28, the pre-exterior device switching unit 28a which includes the second valve member 74 and the passage switching unit 28b which includes the first valve member 72 are mechanically coupled together through the second rod 763b.

According to the above-described arrangement of the first rod 763a and the second rod 763b, the driving shaft 763 is moved in the valve moving axial direction DRa when the feed screw mechanism 762 rotates. Along with this, the driving shaft 763 applies a repelling force to the first valve member 72 and the second valve member 74 against bias force (i.e., spring force) of the first bias member 78 and bias force (i.e., spring force) of the second bias member 80.

The valve driving member 76 switches between a first operation state and a second operation state by moving the first valve member 72 and the second valve member 74 in the valve moving axial direction DRa. In the first operation state, the valve driving member 76 moves the first valve member 72 to set the first valve member 72 in the first communication state and moves the second valve member 74 to set the second valve member 74 in the opening state. In the second operation state, the valve driving member 76 moves the first valve member 72 to set the first valve member 72 in the second communication state and moves the second valve member 74 to set the second valve member 74 in the throttle state.

In other words, in the integrated valve 28, when the valve driving member 76 is switched to the first operation state, the passage switching unit 28b is set to the non-bypass state and the pre-exterior device switching unit 28a is set to the opening side switching state. Conversely, when the valve driving member 76 is switched to the second operation state, the passage switching unit 28b is set to the bypass state and the pre-exterior device switching unit 28a is set to the decompression side switching state. For example, the valve driving member 76 moves the first valve member 72 and the second valve member 74 toward the other side in the valve moving axial direction DRa (see FIG. 2) against the bias forces of the first bias member 78 and the second bias member 80, thereby switching from the second operation state to the first operation state.

A flow of the refrigerant in the heat pump circuit 101 will be described hereafter referring to FIG. 1. The integrated valve 28 serves as a switching device in the heat pump circuit 101 and selectively switches between a first refrigerant circuit as a refrigeration circuit in the cooling mode and a second refrigerant circuit as a refrigeration circuit in the heating mode.

Specifically, the first refrigerant circuit is set when the valve driving member 76 of the integrated valve 28 is set in the first operation state as shown in FIG. 2. The refrigerant flows in the first refrigerant circuit as shown by arrow FLc in FIG. 1. That is, in the first refrigerant circuit, the refrigerant passes through the discharge port 112 of the compressor 11, the interior condenser 12, the third inlet passage 283 of the integrated valve 28, the second outlet passage 285 of the integrated valve 28, the exterior heat exchanger 16, the gas-liquid separator 17, the subcooling device 19, the pre-evaporator decompression unit 291 of the thermal expansion valve 29, the evaporator 22, the thermosensitive unit 292 of the thermal expansion valve 29, the first inlet passage of the integrated valve 28, the first outlet passage 284 of the integrated valve 28, and the suction port 111 of the compressor 11, in this order. In the first refrigerant circuit, the refrigerant flowing into the gas-liquid separator 17 cannot flow out of the gas-liquid separator 17 from the gas-phase refrigerant outlet 17b since the second inlet passage 282 of the integrated valve 28 is closed (refer to FIG. 2).

The second refrigerant circuit is set when the valve driving member 76 of the integrated valve 28 in set in the second operation state as shown in FIG. 3. The refrigerant flows in the second refrigerant circuit as shown by arrow FLh in FIG. 1. That is, in the second refrigerant circuit, the refrigerant passes through the discharge port 112 of the compressor 11, the interior condenser 12, the third inlet passage 283 of the integrated valve 28, the second outlet passage 285 of the integrated valve 28, the exterior heat exchanger 16, the gas-liquid separator 17, the second inlet passage 282 of the integrated valve 28, the first outlet passage of the integrated valve 28, and the suction port 111 of the compressor 11, in this order. In the second refrigerant circuit, the refrigerant flowing into the gas-liquid separator 17 cannot flow out of the gas-liquid separator 17 from the liquid-phase refrigerant outlet 17c since the first inlet passage 281 of the integrated valve 28 is closed (refer to FIG. 3).

The ECU 50 shown in FIG. 1 includes a microcomputer having a CPU, a ROM, and a RAM (not shown). Signals from the various sensors connected to the ECU 50 are A/D converted by an input circuit (not shown) and then are input to the microcomputer. The ECU 50 serves as an air conditioning controller that performs various air conditioning controls. The ECU 50 performs, as one of the air conditioning controls, a refrigeration cycle switching control that switches between the first refrigeration circuit and the second refrigerant circuit.

Figure 4:
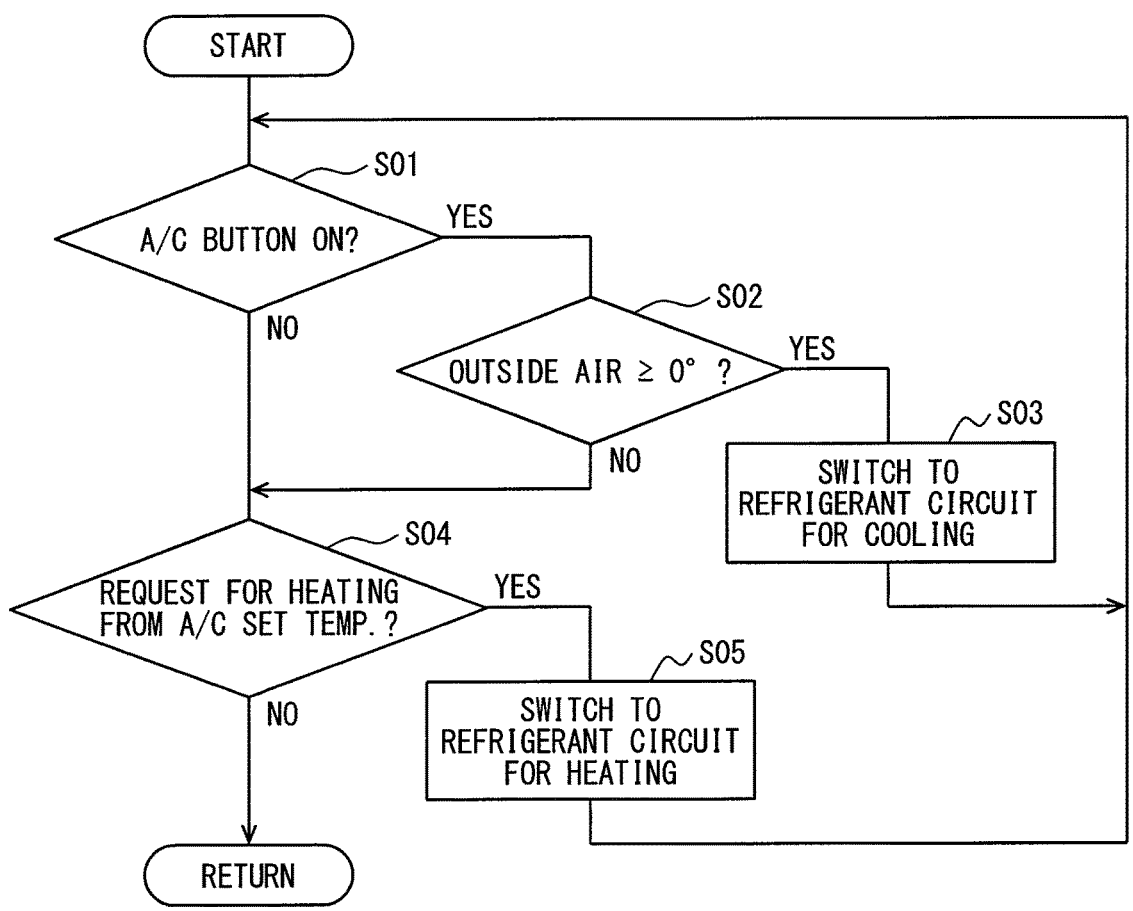
FIG. 4 is a flow chart showing a control process of a refrigerant circuit switching control performed by an electronic control unit shown in FIG. 1.

FIG. 4 shows a flowchart of a control process to perform the refrigeration cycle switching control. The ECU 50 starts the control process shown in FIG. 4 when an ignition switch of the vehicle is turned on, and repeatedly performs the control process on a periodic basis.

As shown in FIG. 4, the ECU 50 determines whether an A/C button (not shown), which serves as an air conditioning switch, is turned on by a passenger at step S01. The air conditioning switch is an operation switch that is switched between being on and being off, and is located at a location in the vehicle cabin where the passenger operates the air conditioning switch easily. The passenger turns on the air conditioning switch to operate an air conditioning in which the air is cooled or dehumidified by the evaporator 22.

When it is determined that the air conditioning switch is turned on at step S01, the control process advances to step S02. On the other hand, when it is determined that the air conditioning switch is not turned on at step S01, e.g., when it is determined that the air conditioning switch is turned off, the control process advances to step S04.

At step S02, the ECU 50 receives a temperature detection signal, which is output from an outside air temperature sensor and relates to an outside temperature, and then determines whether the outside temperature is 0° C. or higher. When the outside temperature is determined to be 0° C. or higher at step S02, the control process advances to step S03. On the other hand, the control process advances to step S04 when the outside temperature is determined to be lower than 0° C.

At step S03, the actuator 761 of the integrated valve 28 is operated such that the valve driving member 76 sets the first operation state. In a case where the first operation state has been set already, the first operation state is continued. Accordingly, the first refrigeration circuit for the cooling mode in which the refrigerant flows in the heat pump circuit 101 as shown by arrow FLc (refer to FIG. 1) is set. Then, the refrigeration cycle device 10 operates in the cooling mode.

The ECU 50 moves the air passage switching door 33 (refer to FIG. 1) to the first door position where the air passage switching door 33 closes the warm air passage 31a at the same time as setting the first refrigeration circuit. Accordingly, the flow of ventilation air to the warm air passage 31a of the interior air conditioning unit 30 substantially stops, and heat exchange between refrigerant and ventilation air within the interior condenser 12 also substantially stops.

As a result, a gas-phase refrigerant, which is discharged from the discharge port 112 of the compressor 11 and has a high temperature and a high pressure, flows into the exterior heat exchanger 16 through the pre-exterior device switching unit 28a of the integrated valve 28 without dissipating heat in the interior condenser 12. At this time, the second valve member 74, which serves as the valve body of the pre-exterior device switching unit 28a, is open, whereby the gas-phase refrigerant flows, almost without being decompressed in the second valve member 74, from the second outlet passage 285 (see FIG. 2) of the integrated valve 28 to the exterior heat exchanger 16 while being kept superheated.

Turning to the outflow refrigerant pressure of the refrigerant flowing out from the second outlet passage 285 of the integrated valve 28, when the pre-exterior device switching unit 28a of the integrated valve 28 is in the opening side switching state, the pre-exterior device switching unit 28a adjusts the outflow refrigeration pressure such that the refrigerant in the exterior heat exchanger 16 reaches a higher temperature than outside air. In other words, when the pre-exterior device switching unit 28a is in the opening side switching state, refrigerant at the refrigerant inlet 161 of the exterior heat exchanger 16, which is set to a pressure so as to reach a higher temperature than outside air, is guided to flow into the exterior heat exchanger 16. Accordingly, in this case, the exterior heat exchanger 16 serves as an exterior condenser that condenses the refrigerant by performing a heat exchange between the refrigerant and the outside air. After this heat exchange, the exterior heat exchanger 16 guides the refrigerant to flow to the gas-liquid separator 17.

The first valve member 72 of the integrated valve 28 is set in the first communication state (refer to FIG. 2) when the first refrigeration circuit is set, whereby the refrigerant does not flow out of the gas-liquid separator 17 from the gas-phase refrigerant outlet 17b and flows out of the gas-liquid separator 17 from the liquid-phase refrigerant outlet 17c. That is, the gas-liquid separator 17 serves as a receiver that discharges the liquid-phase refrigerant mainly. The interior air conditioning unit 30 is configured to perform a cooling operation in which the evaporator 22 cools the air when the first refrigeration circuit is set. After step S03 shown in FIG. 4, the control process returns to step S01.

At step S04 in FIG. 4, it is determined whether a heating request, which is a request from the passenger to perform a heating operation, is made based on an air-conditioning set temperature. For example, the air-conditioning set temperature is set by the passenger as a target temperature inside the vehicle cabin. For example, the ECU 50 determines that the heating request is made when the air-conditioning target temperature exceeds an inside air temperature inside the vehicle cabin detected by an inside air temperature sensor.

The control process advances to step S05 when it is determined that the heating request is made at step S04. When it is determined that the heating request is not made, the control process of FIG. 4 is terminated and restarted from step S01.

At step S05, the actuator 761 of the integrated valve 28 is operated such that the valve driving member 76 is set in the second operation state. In a case where the second operation state has been set already, the second operation state is continued. Accordingly, the second refrigerant circuit for heating mode in which the refrigerant flows in the heat pump circuit 101 as shown by arrow FLh (refer to FIG. 1) is set. Thus, the refrigeration cycle device 10 is operated in the heating mode.

The ECU 50 moves the air passage switching door 33 (refer to FIG. 1) to the second door position where the air passage switching door 33 opens the warm air passage 31a at the same time as setting the second refrigerant circuit. Accordingly, the ventilation air flows into the warm air passage 31a of the interior air conditioning unit 30 shown in FIG. 1, heat exchange is performed between refrigerant and ventilation air in the interior condenser 12, and the refrigerant flowing in the interior condenser 12 is condensed, subcooled and flows out from the condenser 12.

Accordingly, as understood when comparing the explanations of step S03 and the explanations of step S05 described above, when the first refrigeration circuit is set, the air passage switching door 33 functions as a heat dissipation switching device that suppresses the dissipation of heat from the refrigerant to ventilation air as compared to when the second refrigerant circuit is set. For this reason, the interior condenser 12 does not perform heat exchange between the refrigerant and ventilation air during the cooling mode of the refrigeration cycle device 10. Conversely, the interior condenser 12 condenses the refrigerant during the heating mode through heat exchange.

When the second refrigerant circuit is set, the second valve member 74 of the integrated valve 28 is set in the throttle state, whereby the refrigerant flowing into the third inlet passage 283 is decompressed and expanded in the throttle hole 74a (refer to FIG. 3) and becomes a gas-liquid two phase refrigerant. The gas-liquid two phase refrigerant flows from the second outlet passage 285 of the integrated valve 28 to the exterior heat exchanger 16.

Turning to the outflow refrigerant pressure of the refrigerant flowing out from the second outlet passage 285 of the integrated valve 28, when the pre-exterior device switching unit 28a of the integrated valve 28 is in the decompression side switching state, the pre-exterior device switching unit 28a adjusts the outflow refrigeration pressure such that the refrigerant in the exterior heat exchanger 16 reaches a lower temperature than outside air. In other words, when the pre-exterior device switching unit 28a is in the decompression side switching state, refrigerant at the refrigerant inlet 161 of the exterior heat exchanger 16, which is set to a pressure so as to reach a lower temperature than outside air, is guided to flow into the exterior heat exchanger 16. Accordingly, in this case, the exterior heat exchanger 16 serves as an exterior evaporator that evaporates the refrigerant by performing a heat exchange between the refrigerant and the outside air. That is, the exterior heat exchanger 16 may be switched between serving as an exterior condenser and serving as an exterior evaporator in accordance with switching the pre-exterior device switching unit 28a of the integrated valve 28 between the opening side switching state and the decompression side switching state. The exterior heat exchanger 16 guides the refrigerant after exchanging heat to flow to the gas-liquid separator 17.

The first valve member 72 of the integrated valve 28 sets the second communication state (refer to FIG. 3) when the second refrigerant circuit is set, whereby the refrigerant does not flow out of the gas-liquid separator 17 from the liquid-phase refrigerant outlet 17c and flows out of the gas-liquid separator 17 from the gas-phase refrigerant outlet 17b. That is, the gas-liquid separator 17 serves as an accumulator that discharges the gas-phase refrigerant mainly. The interior air conditioning unit 30 is configured to perform a heating operation in which the interior condenser 12 heats for example the ventilation air when the second refrigerant circuit is set. At this time, the refrigerant does not flow through the evaporator 22, whereby the ventilation air passes through the evaporator 22 without exchanging heat with the refrigerant. After step S05 of FIG. 4, the control process returns to step S01.

Although illustrations are omitted, the ECU 50 performs other air conditioning controls while performing the control process of FIG. 4. These other air conditioning controls may, for example, include a blower control, a compressor control, an air passage switching door control, and a blowing mode control. In the blower control, the ECU 50 increases and decreases a volume of air blown by the blower of the interior air conditioning unit 30. In the compressor control, the ECU 50 increases and decreases a rotational speed of the compressor 11. In the air passage switching door control, the ECU 50 rotates the air passage switching door 33. In the blowing mode control, the ECU 50 moves the switching door located in the opening of the housing 31.

The processing in each step shown in FIG. 4 forms a functional unit that implements each of those functions.

As described above, according to the present embodiment, the pre-exterior device switching unit 28a and the passage switching unit 28b form the integrated valve 28 in which the pre-exterior device switching unit 28a and the passage switching unit 28b are mechanically coupled to each other. Then, in the integrated valve 28, the passage switching unit 28b may be switched to the non-bypass state while the pre-exterior device switching unit 28a may be switched to the opening side switching state. Conversely, the passage switching unit 28b may be switched to the bypass state while the pre-exterior device switching unit 28a may be switched to the decompression side switching state. Accordingly, as compared to a configuration where the pre-exterior device switching unit 28a and the passage switching unit 28b are provided as separate control valves, it is possible to reduce the number of control valves in the refrigeration cycle device 10. For example, as compared to the refrigeration cycle device of Patent Literature 1, the number of control valves may be reduced.

Further, according to the present embodiment, the gas-phase refrigerant outlet 17b of the gas-liquid separator 17 mainly guides gas-phase refrigerant to flow to the bypass passage 56, while the liquid-phase refrigerant outlet 17c of the gas-liquid separator 17 mainly guides liquid-phase refrigerant to flow to the evaporator passage 54. Due to this, the gas-liquid separator 17 primarily functions as a receiver that discharges liquid-phase refrigerant when the first refrigeration circuit for cooling is set. Further, the gas-liquid separator 17 primarily functions as an accumulator that discharges gas-phase refrigerant when the second refrigeration circuit for heating is set. Accordingly, as compared to the refrigeration cycle device of Patent Literature 1 which includes gas-liquid separators of both an accumulator and a receiver, it is possible to reduce the number of gas-liquid separators. As a result, for example, it is possible to reduce the mounting space of the refrigeration cycle device 10.

Further, according to the present embodiment, the passage switching unit 28b of the integrated valve 28 opens and closes the bypass passage 56 as well as opens and closes the evaporator passage 54. Accordingly, as compared to a configuration where the function of opening and closing one of the bypass passage 56 and the evaporator passage 54 is provided separately from the integrated valve 28, it is easier to reduce the mounting space of the refrigeration cycle device 10.

Further, according to the present embodiment, the integrated valve 28 includes the first valve member 72 while serves as a valve body of the passage switching unit 28b, the second valve member 74 which serves as a valve body of the pre-exterior device switching unit 28a, and the driving shaft 763 which is coupled to each of the first valve member 72 and the second valve member 74. Thus, the pre-exterior device switching unit 28a and the passage switching unit 28b are mechanically coupled together through the driving shaft 763. Accordingly, the pre-exterior device switching unit 28a and the passage switching unit 28b may be mechanically coupled together by a simple mechanism.

Further, according to the present embodiment, the throttle hole 74a that penetrates through the second valve member 74 is formed in the second valve member 74. Then, the pre-exterior device switching unit 28a is set to the opening side switching state due to the second valve member 74 separating from the third valve seat 703. Conversely, the pre-exterior device switching unit 28a is set to the compression side switching state due to the second valve member 74 abutting on the third valve seat 703 along with the refrigerant from the third inlet passage passing through the throttle hole 74a. Accordingly, a configuration of the integrated valve capable of switching the pre-exterior device switching unit 28a between the opening side switching state and the compression side switching state may be implemented with a simple configuration by providing the throttle hole 74a.

Further, according to the present embodiment, the pre-exterior device switching unit 28a of the integrated valve 28, when in the opening side switching state, guides refrigerant at the refrigerant inlet 161 of the exterior heat exchanger 16, which is set to a pressure so as to reach a higher temperature than outside air, to flow into the exterior heat exchanger 16. Conversely, when in the compression side switching state, refrigerant at the refrigerant inlet 161 of the exterior heat exchanger 16, which is set to a pressure so as to reach a lower temperature than outside air, is guided to flow into the exterior heat exchanger 16. Accordingly, by switching the pre-exterior device switching unit 28a, it is possible for the exterior heat exchanger 16 to function as an exterior evaporator or an exterior condenser.

Furthermore, according to the present embodiment, in the heat pump circuit 101 shown in FIG. 1, the first inlet passage 281 of the integrated valve 28 is connected to the evaporator 22, and the second inlet passage 282 is connected to the gas-phase refrigerant outlet 17b of the gas-liquid separator 17. The third inlet passage 283 is connected to the refrigerant outlet 122 of the interior condenser 12, the first outlet passage 284 is connected to the suction port 111 of the compressor 11, and the second outlet passage 285 is connected to the exterior heat exchanger 16. Thus, the first refrigeration circuit for the cooling operation and the second refrigerant circuit for the heating operation can be set selectively in a manner that the valve driving member 76 of the integrated valve 28 switches between the first operation state shown in FIG. 2 and the second operation state shown in FIG. 3.

According to the present embodiment, a pressure difference between a pressure of the refrigerant in the second inlet passage 282 and a pressure of the refrigerant in the second outlet passage 285 is always small both in the first refrigeration circuit and the second refrigerant circuit. That is, a pressure of the refrigerant flowing into the second inlet passage 282 of the integrated valve 28 is closer to the pressure of the refrigerant in the second outlet passage 285 than a pressure of the refrigerant flowing into the first inlet passage 281. Therefore, although the sealing member 84 is disposed in the insert hole 70a of the body 70 according to the present embodiment, the sealing member 84 can be omitted. Even if the sealing member 84 is omitted, the refrigerant does not flow between the second inlet passage 282 and the second outlet passage 285 since the pressure difference between the pressure of the refrigerant in the second inlet passage 282 and the pressure of the refrigerant in the second outlet passage 285 is very small.

According to the present embodiment, the driving shaft 763 moves in the valve moving axial direction DRa by rotating the feed screw mechanism 762. The driving shaft 763 applies the repelling force to the first valve member 72 and the second valve member 74 against the bias force of the first bias member 78 and the bias force of the second bias member 80. As a result, a position of the driving shaft 763 in the valve moving axial direction DRa can be retained by the feed screw mechanism 762 even when the actuator 761 is not energized.

Moreover, the repelling force of the driving shaft 763 is applied in a direction opposite to a direction in which the refrigerant in the second inlet passage 282 pushes the first valve member 72, although the pressure of the refrigerant in the second inlet passage 282 is close to a discharge pressure of the compressor 11 when the first valve member 72 is in the first communication state shown in FIG. 2. That is, when the first valve member 72 is in the first communication state, the feed screw mechanism 762 of the valve driving member 76 presses the first valve member 72 against the second valve seat 702 in the valve moving axial direction DRa, whereby the first valve member 72 closes the second inlet passage 282.

Therefore, when the first valve member 72 is in the first communication state in the cooling mode, the feed screw mechanism 762 of the valve driving member 76 can retain the position of the first valve member 72 closing the second inlet passage 282, although the pressure close to the discharge pressure of the compressor 11 is applied to the first valve member 72 in a direction to open the second inlet passage 282.

Second Embodiment

A second embodiment of the present disclosure will be described. In the present embodiment, mainly features that are different from the first embodiment will be described. A description of a part that corresponds to or is equivalent to a matter described in a preceding embodiment may be omitted or simplified.

Figure 5:
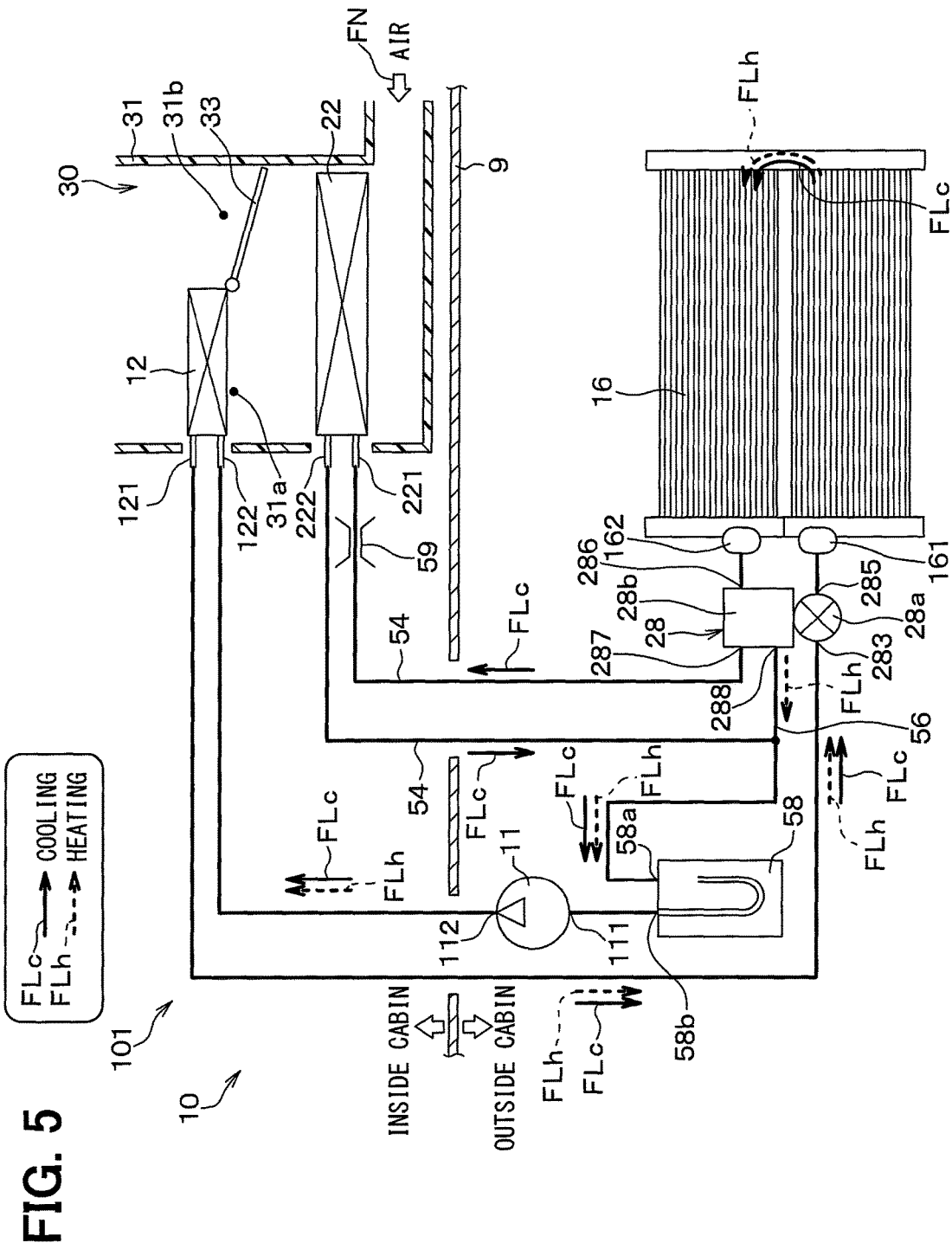
FIG. 5 is an overview configuration diagram of a vehicle air conditioner according to a second embodiment, and corresponds to FIG. 1 of the first embodiment.

FIG. 5 is an overall configuration diagram of a vehicle air conditioner 8 according to the present embodiment, and corresponds to FIG. 1 in the first embodiment. As shown in FIG. 5, according to the present embodiment, the subcooling device 19 and the gas-liquid separator 7 (refer to FIG. 1) are not provided, while the heat pump circuit 101 includes an accumulator 58. Further, instead of the thermal expansion valve 29, the heat pump circuit 101 includes a fixed decompression valve 59 as a fixed throttle. The present embodiment differs from the first embodiment in these points. Further, the connections of the integrated valve 28 in the present embodiment differ from the first embodiment. Further, while in the present embodiment the vehicle air conditioner 8 includes the ECU 50 in the same manner as the first embodiment, in FIG. 5, the ECU 50 is omitted from illustration. The same applies to FIGS. 7, 8, 10, 12, and 13-16 described later.

Specifically, as shown in FIG. 5, the accumulator 58 includes a refrigerant inlet 58a and a refrigerant outlet 58b. The refrigerant inlet 58a of the accumulator 58 is connected to each of the refrigerant flow downstream side of the evaporator passage 54 and the refrigerant flow downstream side of the bypass passage 56. Further, the refrigerant outlet 58b of the accumulator 58 is connected to the suction port 111 of the compressor 11. The accumulator 58 includes a gas-liquid separation function of separating gas and liquid refrigerant similar to the gas-liquid separator 17 of the first embodiment, and includes a function of a reservoir. However, the accumulator 58 differs from the gas-liquid separator 17 by mainly discharging gas-phase refrigerant from the refrigerant outlet 58b.

The fixed decompression valve 59 is a refrigerant decompression unit that corresponds to the pre-evaporator decompression unit 291 of the thermal expansion valve 29 in the first embodiment, but differs from the pre-evaporator decompression unit 291 by having a fixed throttle opening degree which is invariable. Specifically, the fixed decompression valve 59 is disposed in the evaporator passage 54, and refrigerant from the exterior heat exchanger 16 flows into the fixed decompression valve 59. Then, the fixed decompression valve 59 decompresses that refrigerant and guides that refrigerant to flow to the refrigerant inlet 221 of the evaporator 22.

Figure 6:
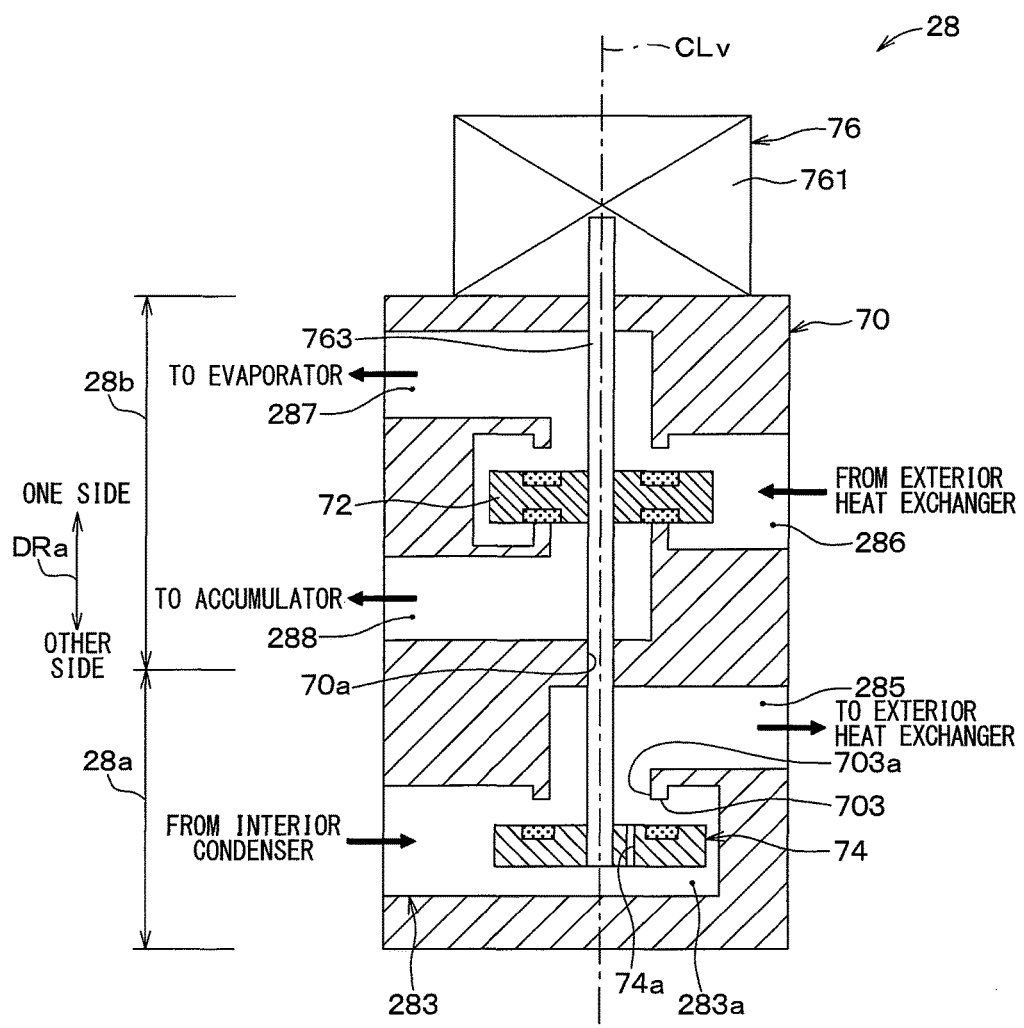
FIG. 6 is a cross sectional view of an integrated valve unit in the second embodiment, and illustrates the internal configuration of an integrated valve.

FIG. 6 is a cross-sectional view showing the integrated valve 28 standalone in the present embodiment, and shows the internal configuration of the integrated valve 28. The integrated valve 28 in FIG. 6 is shown in a state during the cooling mode. Further, the illustration of the internal configuration of the integrated valve 28 in FIG. 6 is simplified, and the illustrations of the feed screw mechanism 762, the first bias member 78, the second bias member 80, the adjusting screw 82, and the seal member (refer to FIG. 2) are omitted. This simplification of illustration in FIG. 6 also applies to FIG. 9 and FIG. 11 described later.

As shown in FIG. 5 and FIG. 6, in the integrated valve 28 of the present embodiment, instead of the first inlet passage 281, the second inlet passage 282, and the first outlet passage 284 (refer to FIG. 2) of the first embodiment, an exterior device connection passage 286, a decompression valve connection passage 287, and an accumulator connection passage 288 are provided. The exterior device connection passage 286 is an inlet passage of the passage switching unit 28b, while both the decompression valve connection passage 287 and the accumulator connection passage 288 are outlet passages of the passage switching unit 28b.

The exterior device connection passage 286 of the integrated valve 28 is connected to the refrigerant outlet 162 of the exterior heat exchanger 16. Further, the decompression valve connection passage 287 is connected to the fixed decompression valve 59 through the evaporator 22. In other words, the decompression valve connection passage 287 is connected to the refrigerant flow upstream side of the evaporator passage 54. Further, the accumulator connection passage 288 is connected through the bypass passage 56 to the refrigerant inlet 58a of the accumulator 58.

In this manner, the connection points of the passage switching unit 28b differ from those of the first embodiment, so the definitions of the first communication state and the second communication state of the first valve member 72, which is a valve body of the passage switching unit 28b, differ from those of the first embodiment. In other words, in the present embodiment, the first communication state of the first valve member 72 refers to a state where the exterior device connection passage 286 is communicated to the decompression valve connection passage 287 while blocked from the accumulator connection passage 288. Further, the second communication state of the first valve member 72 refers to a state where the exterior device connection passage 286 is communicated to the accumulator connection passage 288 while blocked from the decompression valve connection passage 287.

The driving shaft 763 may include two rods similar to the first embodiment, but in the present embodiment, the driving shaft 763 is formed of a single rod. Accordingly, within the rod of the driving shaft 763, the portion between the actuator 761 and the first valve member 72 corresponds to the first rod 763a of the first embodiment (refer to FIG. 2), and the portion between the first valve member 72 and the second valve member 74 corresponds to the second rod 763b (refer to FIG. 2) of the first embodiment.

In the refrigeration cycle device 10 configured in this manner as well, the integrated valve 28 operates in the same manner as the first embodiment. In other words, at step S03 of FIG. 4, due to the operation of the actuator 761 of the integrated valve 28, the valve driving member 76 of the integrated valve 28 is switched to the first operation state.

Then, during the first operation state of the valve driving member 76, the first valve member 72 shown in FIG. 6 is set to the first communication state, and the second valve member 74 is opened. FIG. 6 shows the valve driving member 76 of the integrated valve 28 in the first operation state.

Due to this, the first refrigerant circuit is set in the heat pump circuit 101, and refrigerant circulates as shown by the arrows FLc in FIG. 5. In other words, in the first refrigerant circuit, refrigerant flows, in order, from the discharge port 112 of the compressor 11, to the interior condenser 12, the third inlet passage 283 of the integrated valve 28, the second outlet passage 285 of the integrated valve 28, the exterior heat exchanger 16, the exterior device connection passage 286 of the integrated valve 28, the decompression valve connection passage 287 of the integrated valve 28, the fixed decompression valve 59, the evaporator 22, the accumulator 58, and then to the suction port 111 of the compressor 11.

Conversely, at step S05 of FIG. 4, due to the operation of the actuator 761 of the integrated valve 28, the valve driving member 76 of the integrated valve 28 is switched to the second operation state. Then, during the second operation state of the valve driving member 76, the first valve member 72 shown in FIG. 6 is set to the second communication state, and the second valve member 74 is set to a throttled state.

Due to this, the second refrigerant circuit is set in the heat pump circuit 101, and refrigerant circulates as shown by the arrows FLh in FIG. 5. In other words, in the second refrigerant circuit, refrigerant flows, in order, from the discharge port 112 of the compressor 11, to the interior condenser 12, the third inlet passage 283 of the integrated valve 28, the second outlet passage 285 of the integrated valve 28, the exterior heat exchanger 16, the exterior device connection passage 286 of the integrated valve 28, the accumulator connection passage 288 of the integrated valve 28, the accumulator 58, and then to the suction port 111 of the compressor 11.

According to the present embodiment, due to the configurations which are common with the first embodiment described previously, the same effects as the first embodiment may be exhibited.

Third Embodiment

A third embodiment of the present disclosure will be described. In the present embodiment, mainly features that are different from the first embodiment will be described.

Figure 7:
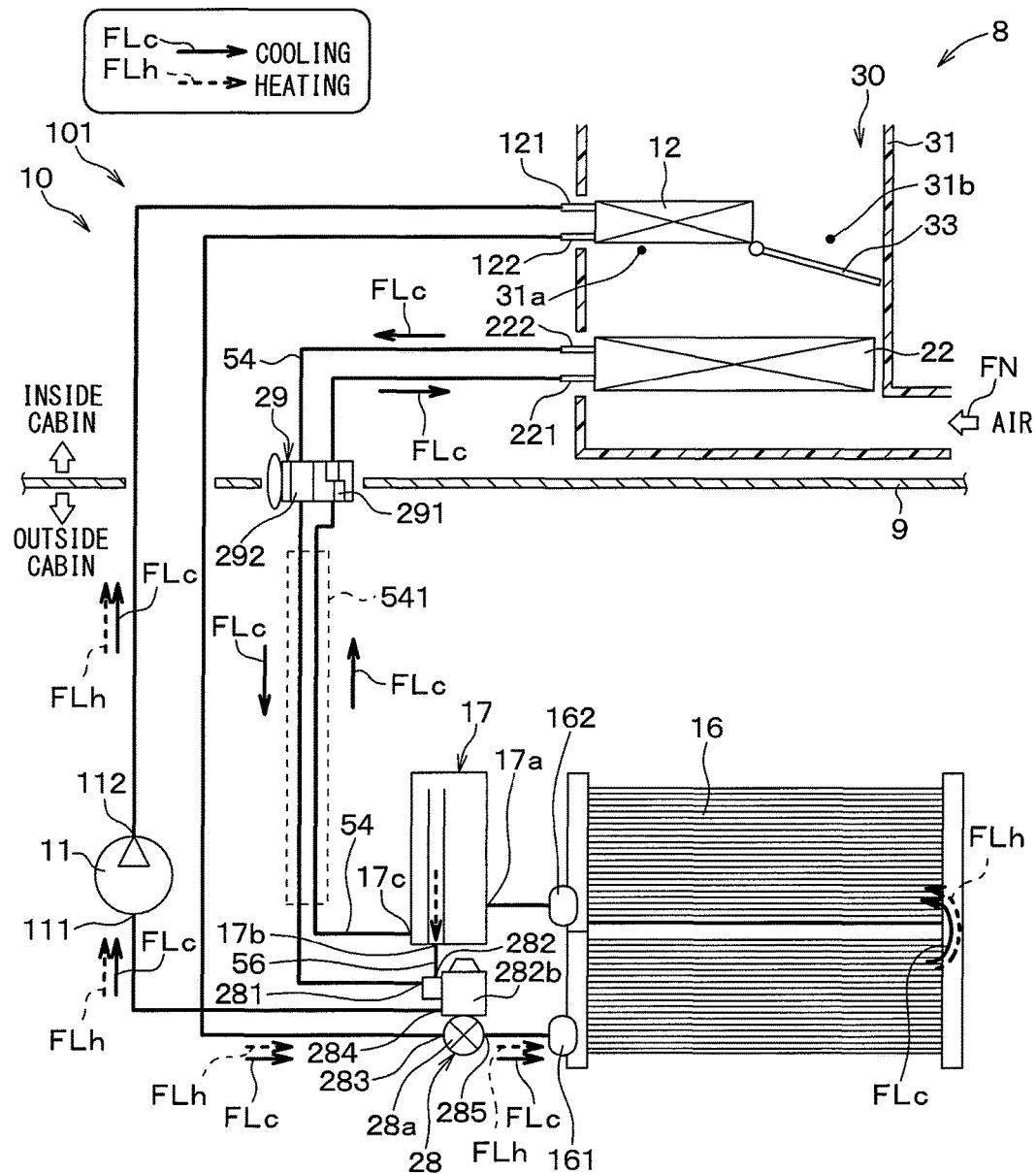
FIG. 7 is an overview configuration diagram of a vehicle air conditioner according to a third embodiment, and corresponds to FIG. 1 of the first embodiment.

FIG. 7 is an overall configuration diagram of a vehicle air conditioner 8 according to the present embodiment, and corresponds to FIG. 1 in the first embodiment. As shown in FIG. 7, according to the present embodiment, the subcooling device 19 (refer to FIG. 1) is not provided, while the heat pump circuit 101 includes an internal heat exchanger 541. The present embodiment differs from the first embodiment in this point. Further, while the illustrated shapes of the gas-liquid separator 17 and the integrated valve 28 in FIG. 7 differ from those of the first embodiment, the gas-liquid separator 17 and the integrated valve 28 of the present embodiment as substantially the same as those of the first embodiment.

Specifically, the internal heat exchanger 541 has a conventional internal structure. In other words, the internal heat exchanger 541 exchanges heat between an upstream side refrigerant which flows from the liquid-phase refrigerant outlet 17c of the gas-liquid separator 17 to the pre-evaporator decompression unit 291 of the thermal expansion valve 29 with a downstream side refrigerant that flows from the thermosensitive unit 292 of the thermal expansion valve 29 to the first inlet passage 281 of the integrated valve 28. Due to this, the internal heat exchanger 541 cools the upstream side refrigerant while heating the downstream side refrigerant.

According to the present embodiment, due to the configurations which are common with the first embodiment described previously, the same effects as the first embodiment may be exhibited. Further, according to the present embodiment, by providing the internal heat exchanger 541, when the first refrigerant circuit is set, the temperature of the refrigerant flowing into the evaporator 22 may be reduced, and the temperature of the refrigerant sucked into the compressor 11 may be increased.

Further, while the present embodiment is a modification based on the first embodiment, the present embodiment may be combined with the second embodiment as well.

Fourth Embodiment

A fourth embodiment of the present disclosure will be described. In the present embodiment, mainly features that are different from the first embodiment will be described.

Figure 8:
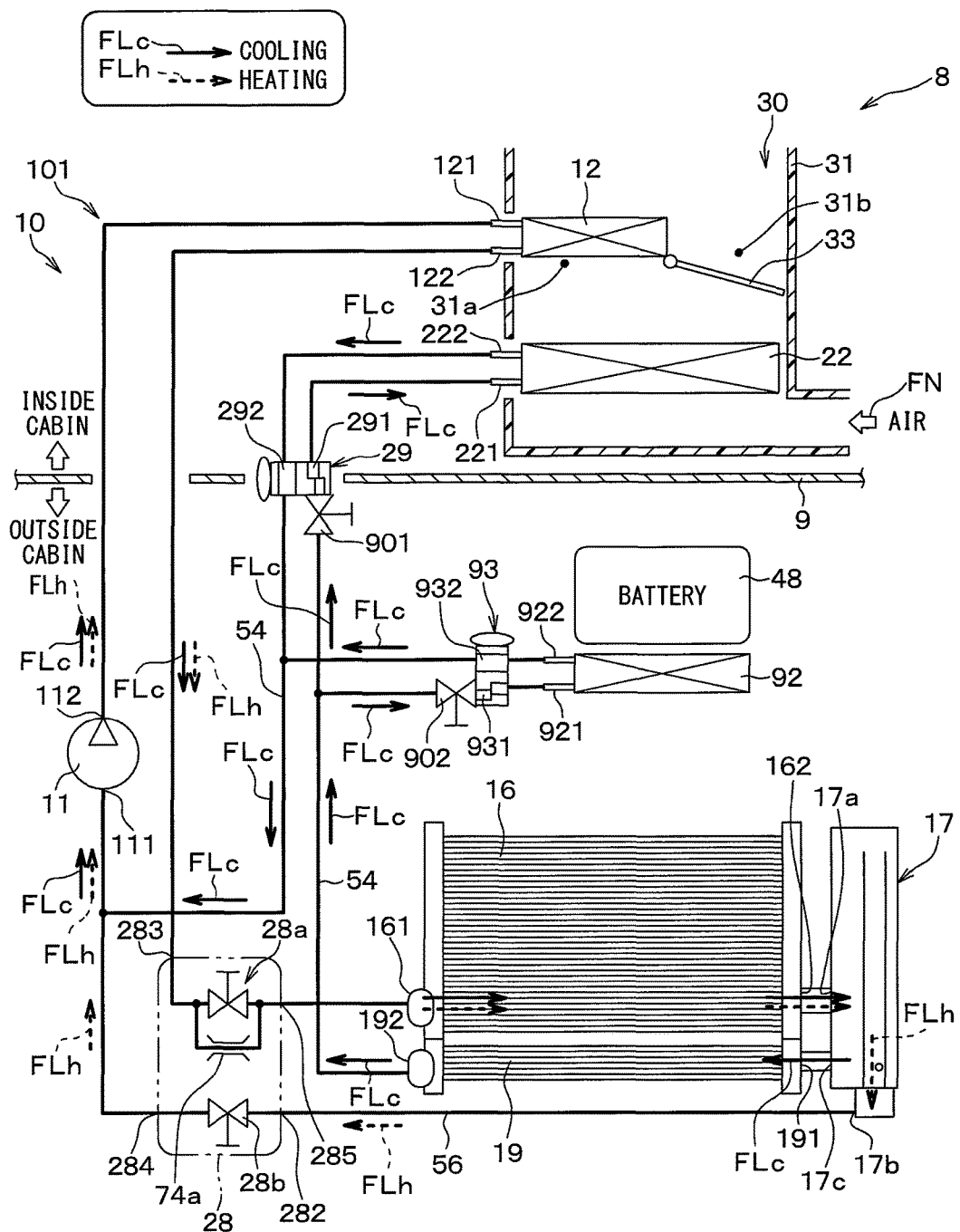
FIG. 8 is an overview configuration diagram of a vehicle air conditioner according to a fourth embodiment, and corresponds to FIG. 1 of the first embodiment.

FIG. 8 is an overall configuration diagram of a vehicle air conditioner 8 according to the present embodiment, and corresponds to FIG. 1 in the first embodiment. As shown in FIG. 8, according to the present embodiment, the heat pump circuit 101 includes a first opening/closing valve 901, a second opening/closing valve 902, a second evaporator 92, and a second thermal expansion valve 93. The present embodiment differs from the first embodiment in this point. Further, the vehicle air conditioner 8 of the present embodiment is mounted on a hybrid type vehicle, so a battery 48 is provided as a power source for motor propulsion. Further, the evaporator 22 is referred to as a first evaporator 22 in the present embodiment, and the thermal expansion valve 29 is referred to as a first thermal expansion valve 29 in the present embodiment.

Each of the first opening/closing valve 901 and the second opening/closing valve 902 is a separate opening and closing valve which is not mechanically coupled with the integrated valve 28.

Specifically, the first opening/closing valve 901 is disposed on the refrigerant flow upstream side with respect to the pre-evaporator decompression unit 291 of the first thermal expansion valve 29, i.e., at the refrigerant inlet of the pre-evaporator decompression unit 291. Accordingly, the pre-evaporator decompression unit 291 is connected to the refrigerant outlet 192 of the subcooling device 19 through the first opening/closing valve 901.

This first opening/closing valve 901 is a valve mechanism that opens and closes the refrigerant inlet of the pre-evaporator decompression unit 291 according to a control signal output from the ECU 50. In other words, the first opening/closing valve 901 functions as a passage opening/closing unit that opens and closes the evaporator passage 54.

Further, the first opening/closing valve 901 is integrated with the first thermal expansion valve 29, for example by being fastened to the first thermal expansion valve 29 by bolts. Further, the first opening/closing valve 901 may be disposed at locations other than the refrigerant inlet of the pre-evaporator decompression unit 291, as long as the first opening/closing valve 901 is able to open and close the evaporator passage 54.

Further, the thermosensitive unit 292 of the thermal expansion valve 29 is connected to the suction port 111 of the compressor 11.

The second thermal expansion valve 93 is an expansion valve with the same structure as the first thermal expansion valve 29, and is disposed in parallel with the first thermal expansion valve 29. In other words, the second thermal expansion valve 93 includes a pre-evaporator decompression unit 931 with the same structure as the pre-evaporator decompression unit 291 of the first thermal expansion valve 29, and a thermosensitive unit 932 with the same structure as the thermosensitive unit 292 of the first thermal expansion valve 29. Further, the refrigerant from the refrigerant outlet 192 of the subcooling device 19 flows into the pre-evaporator decompression unit 931 of the second thermal expansion valve 93, and the refrigerant flowing out of the thermosensitive unit 932 of the second thermal expansion valve 93 flows into the suction port 111 of the compressor 11.

The second evaporator 92 is a cooling device that absorbs heat into the refrigerant flowing inside the second evaporator 92 to cool the battery 48. The second evaporator 92 is an evaporator with the same structure as the first evaporator 22 disposed in the interior air conditioning unit 30. The second evaporator 92 includes a refrigerant inlet 921 into which refrigerant from the pre-evaporator decompression unit 931 flows, and a refrigerant outlet 922 which guides refrigerant to flow into the thermosensitive unit 932 of the second thermal expansion valve 93 after being heat exchanged inside the second evaporator 92.

The second opening/closing valve 902 is a valve mechanism with the same structure as the first opening/closing valve 901, and opens and closes a refrigerant passage in which refrigerant circulates to the second thermal expansion valve 93 and the second evaporator 92 based on a control signal output from the ECU 50. The second opening/closing valve 902 disposed on the refrigerant flow upstream side with respect to the pre-evaporator decompression unit 931 of the second thermal expansion valve 93, i.e., at the refrigerant inlet of the pre-evaporator decompression unit 931. For example, the second opening/closing valve 902 is integrated with the second thermal expansion valve 93, by being fastened to the second thermal expansion valve 93 by bolts.

Figure 9:
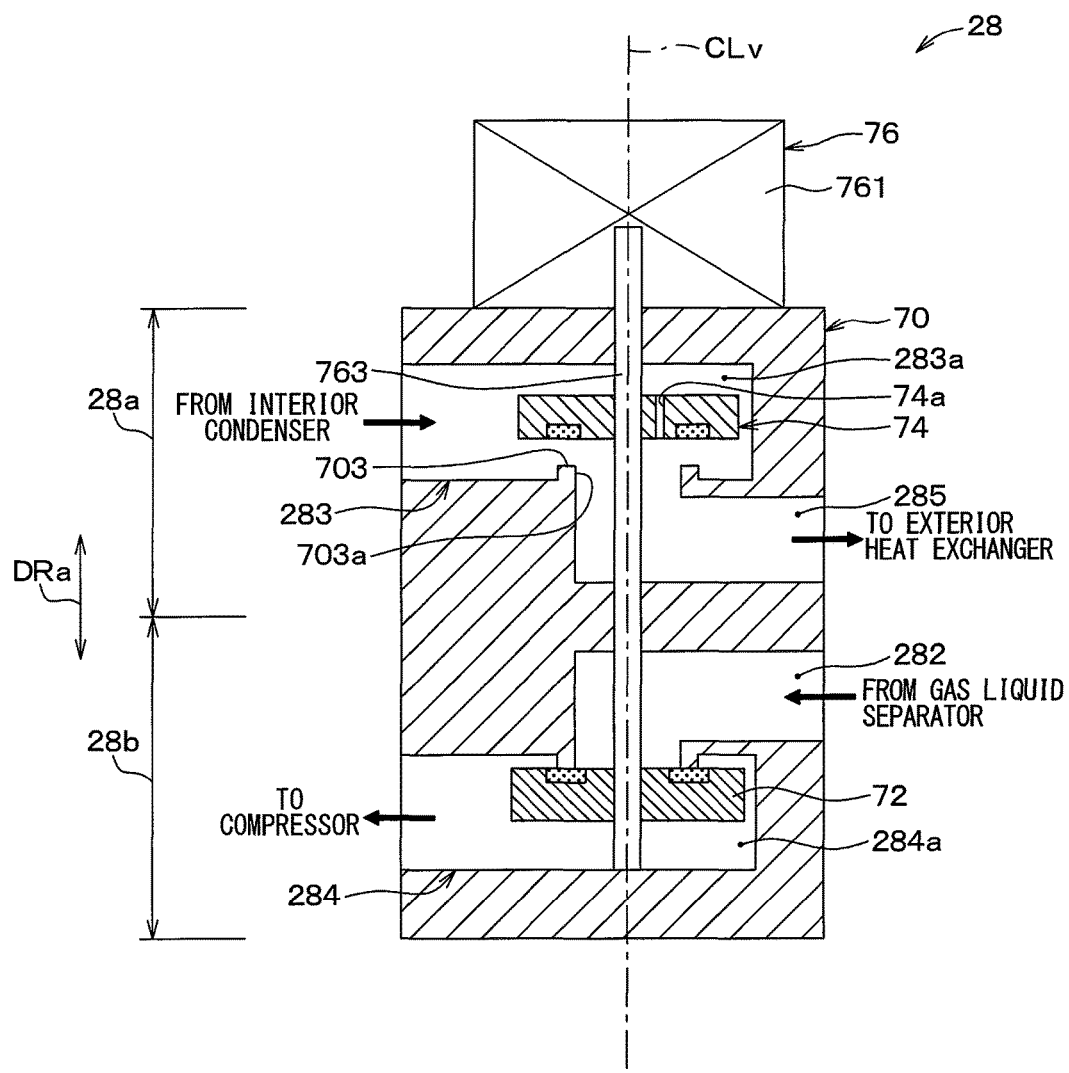
FIG. 9 is a cross sectional view of an integrated valve unit in the fourth embodiment, and illustrates the internal configuration of an integrated valve.

FIG. 9 is a cross-sectional view showing the integrated valve 28 standalone in the present embodiment, and shows the internal configuration of the integrated valve 28. The integrated valve 28 in FIG. 9 is shown in a state during the cooling mode.

As shown in FIG. 9 and FIG. 8, in the integrated valve 28 of the present embodiment, the first inlet passage 281 (refer to FIG. 2) is not provided. Here, in the present embodiment, the second inlet passage 282 is referred to as a pre-compressor inlet passage 282, and the third inlet passage 283 is referred to as a pre-exterior device inlet passage 283.

The pre-compressor inlet passage 282 of the integrated valve is connected to the gas-phase refrigerant outlet 17b of the gas-liquid separator 17, and the pre-exterior device inlet passage 283 is connected to the refrigerant outlet 122 of the interior condenser 12. Further, the first outlet passage 284 is connected to the suction port 111 of the compressor 11, and the second outlet passage 285 is connected to the refrigerant inlet 161 of the exterior heat exchanger 16.

In this regard, since the integrated valve 28 is not provided with the first inlet passage 281 (refer to FIG. 2), the passage switching unit 28b is set to the non-bypass state when the first valve member 72, which is a valve body of the passage switching unit 28b, blocks the connection between the pre-compressor inlet passage 282 and the first outlet passage 284. Conversely, the passage switching unit 28b is set to the bypass state when the first valve member 72 opens the connection between the pre-compressor inlet passage 282 and the first outlet passage 284.

The driving shaft 763 of the present embodiment is formed of a single rod similar to the second embodiment described above. Further, the second valve member 74 is disposed between the first valve member 72 and the actuator 761 in the valve moving axial direction DRa. Accordingly, within the rod of the driving shaft 763, the portion between the actuator 761 and the second valve member 74 corresponds to the first rod 763a of the first embodiment (refer to FIG. 2), and the portion between the first valve member 72 and the second valve member 74 corresponds to the second rod 763b (refer to FIG. 2) of the first embodiment.

In the refrigeration cycle device 10 configured in this manner as well, the integrated valve 28 operates in the same manner as the first embodiment. In other words, at step S03 of FIG. 4, due to the operation of the actuator 761 of the integrated valve 28, the valve driving member 76 of the integrated valve 28 is switched to the first operation state. Then, during the first operation state of the valve driving member 76, the first valve member 72 shown in FIG. 9 blocks the connection between the pre-compressor inlet passage 282 and the first outlet passage 284, while the second valve member 74 is in an opened state. Along with this, the ECU 50 opens the evaporator passage 54 with the first opening/closing valve 901. The valve driving member 76 of the integrated valve 28 in FIG. 9 is shown in the first operation state.

Due to this, the first refrigerant circuit is set in the heat pump circuit 101, and refrigerant circulates as shown by the arrows FLc in FIG. 8. In other words, in the first refrigerant circuit, refrigerant flows, in order, from the discharge port 112 of the compressor 11, to the interior condenser 12, the pre-exterior device inlet passage 283 of the integrated valve 28, the second outlet passage 285 of the integrated valve 28, the exterior heat exchanger 16, the gas-liquid separator 17, the subcooling device 19, the first opening/closing valve 901, pre-evaporator decompression unit 291 of the thermal expansion valve 29, the first evaporator, the thermosensitive unit 292 of the first thermal expansion valve 29, and then to the suction port 111 of the compressor 11.

When the first refrigerant circuit is set, the ECU 50 opens the second opening/closing valve 902 when it is necessary to cool the battery 48 of the refrigeration cycle device 10, thereby causing the refrigerant to circulate to the second evaporator 92 as well.

Conversely, at step S05 of FIG. 4, due to the operation of the actuator 761 of the integrated valve 28, the valve driving member 76 of the integrated valve 28 is switched to the second operation state. Then, during the second operation state of the valve driving member 76, the first valve member 72 shown in FIG. 9 opens the connection between the pre-compressor inlet passage 282 and the first outlet passage 284, and the second valve member 74 is in a throttled state. Along with this, the ECU 50 closes the first opening/closing valve 901 and the second opening/closing valve 902, thereby closing the evaporator passage 54.

Due to this, the second refrigerant circuit is set in the heat pump circuit 101, and refrigerant circulates as shown by the arrows FLh in FIG. 8. In other words, in the second refrigerant circuit, refrigerant flows, in order, from the discharge port 112 of the compressor 11, to the interior condenser 12, the pre-exterior device inlet passage 283 of the integrated valve 28, the second outlet passage 285 of the integrated valve 28, the exterior heat exchanger 16, the gas-liquid separator 17, the pre-compressor inlet passage 282 of the integrated valve 28, the first outlet passage 284, and then to the suction port 111 of the compressor 11.

According to the present embodiment, due to the configurations which are common with the first embodiment described previously, the same effects as the first embodiment may be exhibited.

Fifth Embodiment

A fifth embodiment of the present disclosure will be described. In the present embodiment, mainly features that are different from the first embodiment will be described.

Figure 10:
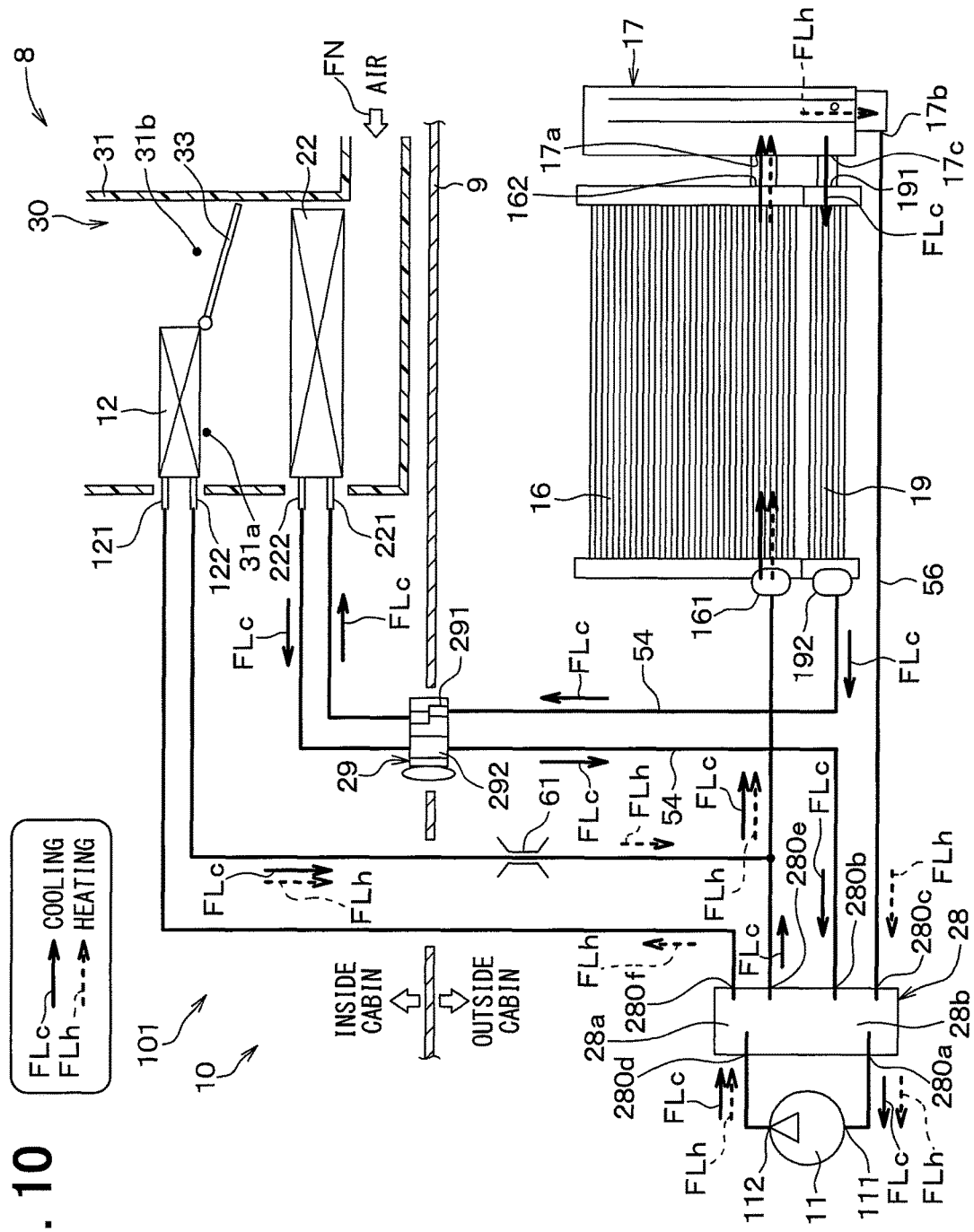
FIG. 10 is an overview diagram of a vehicle air conditioner according to a fifth embodiment, and corresponds to FIG. 1 of the first embodiment.
Figure 11:
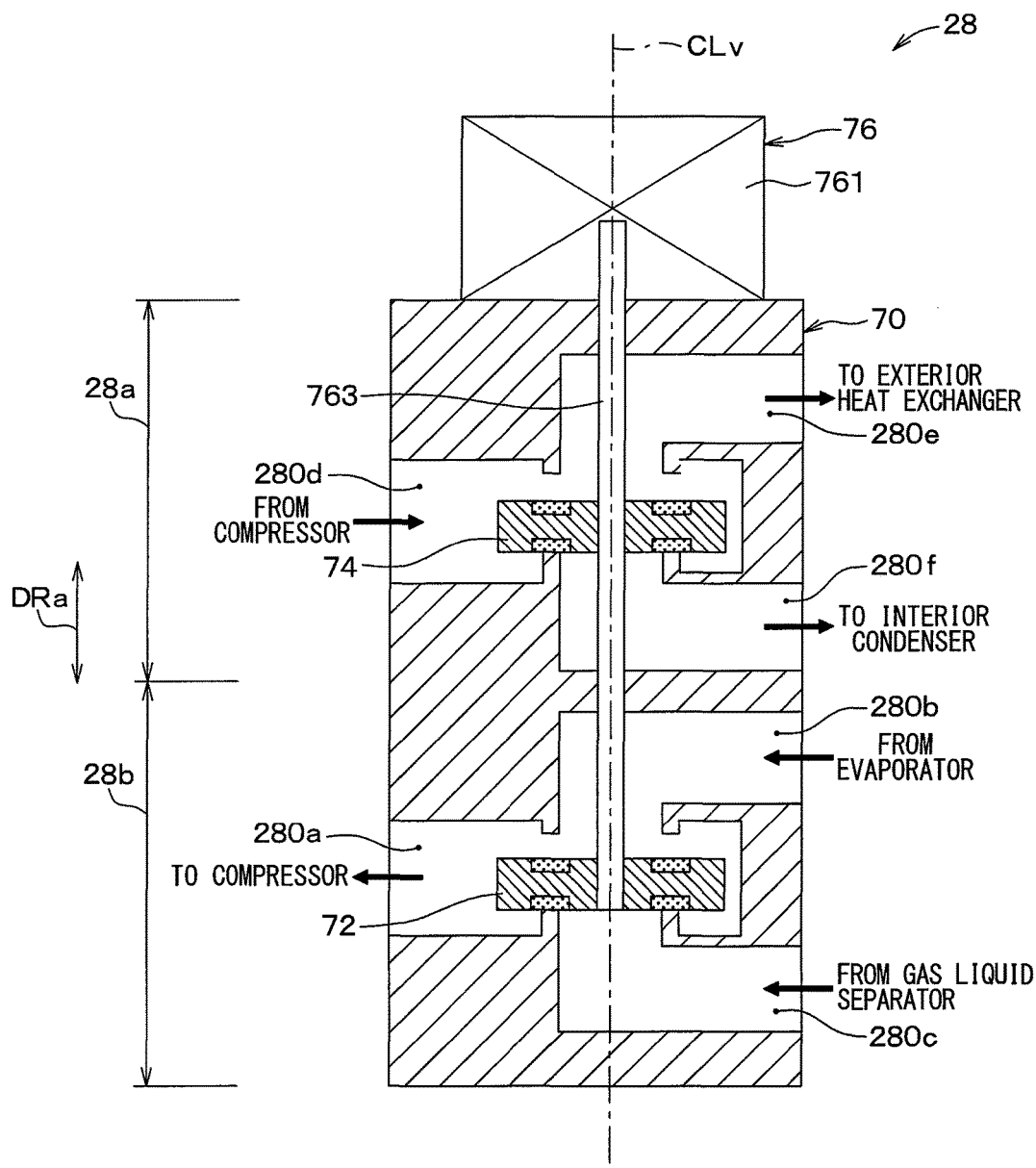
FIG. 11 is a cross sectional view of an integrated valve unit in the fifth embodiment, and illustrates the internal configuration of an integrated valve.

FIG. 10 is an overall configuration diagram of a vehicle air conditioner 8 according to the present embodiment, and corresponds to FIG. 1 in the first embodiment. Further, FIG. 11 is a cross-sectional view showing the integrated valve 28 standalone in the present embodiment, and shows the internal configuration of the integrated valve 28. The integrated valve 28 in FIG. 10 is shown in a state during the cooling mode.

As shown in FIGS. 10 and 11, in the present embodiment, the integrated valve 28 does not include the throttle hole 74a. Instead, the heat pump circuit 101 includes a fixed decompression valve 61 as a pre-exterior device decompression unit. In other words, the integrated valve 28 does not include a decompression function of decompressing the refrigerant, and that decompression function is provided by the fixed decompression valve 61 disposed outside of the integrated valve 28. The present embodiment differs from the first embodiment in these points. Further, the connections of the integrated valve 28 in the present embodiment differ from the first embodiment.

Specifically, as shown in FIG. 10, the fixed decompression valve 61 serves the same role as the throttle hole 74a in the first embodiment (see FIG. 2). In other words, the fixed decompression valve 61 is a fixed throttle, and is disposed in the refrigerant passage that spans from the refrigerant outlet 122 of the interior condenser 12 to the refrigerant inlet 161 of the exterior heat exchanger 16. Thus, the fixed decompression valve 61 decompresses the refrigerant that flows out from the interior condenser 12 and passes through the fixed decompression valve 61.

As shown in FIG. 10 and FIG. 11, instead of the inlet passages 281, 282, 283 and the outlet passages 284, 285 (see FIG. 2), first to sixth ports 280a, 280b, 280c, 280d, 280e, 280f are formed in the body 70 of the integrated valve 28 of the present embodiment.

Among the first to sixth ports, the first port 280a is an outlet port of the passage switching unit 28b, while the second port 280b and the third port 280c are both inlet ports of the passage switching unit 28b. Further, the fourth port 280d is an inlet port of the pre-exterior device switching unit 28a, while the fifth port 280e and the sixth port 280f are each outlet ports of the pre-exterior device switching unit 28a. In other words, both the pre-exterior device switching unit 28a and the passage switching unit 28b are formed as three-way valves and are coupled to each other.

The first port 280a of the integrated valve 28 is connected to the suction port 111 of the compressor 11. Further, the second port 280b is connected to the refrigerant flow downstream side of the evaporator passage 54. In other words, the second port 280b is connected to the thermosensitive unit 292 of the thermal expansion valve 29. Further, the third port 280c is connected to the refrigerant flow downstream side of the bypass passage 56. In other words, the third port 280c is connected to the gas-phase refrigerant outlet 17b of the gas-liquid separator 17.

Further, the fourth port 280d is connected to the discharge port 112 of the compressor 11. Further, the fifth port 280e is connected to the refrigerant inlet 161 of the exterior heat exchanger 16 while bypassing the interior condenser 12 and the fixed decompression valve 61. Further, the sixth port 280f is connected to the refrigerant inlet 121 of the interior condenser 12.

The driving shaft 763 shown in FIG. 11 may include two rods similar to the first embodiment, but in the present embodiment, the driving shaft 763 is formed of a single rod. Further, the second valve member 74 is disposed between the first valve member 72 and the actuator 761 in the valve moving axial direction DRa. Accordingly, within the rod of the driving shaft 763, the portion between the actuator 761 and the second valve member 74 corresponds to the first rod 763a of the first embodiment (refer to FIG. 2), and the portion between the first valve member 72 and the second valve member 74 corresponds to the second rod 763b (refer to FIG. 2) of the first embodiment.

According to the integrated valve 28 of the present embodiment as well, similar to the first embodiment, the pre-exterior device switching unit 28a and the passage switching unit 28b are mechanically coupled to each other and switched through the driving shaft 763. In other words, the passage switching unit 28b may be switched to the non-bypass state while the pre-exterior device switching unit 28a may be switched to the opening side switching state. Specifically, the passage switching unit 28b is set in the non-bypass state due to the first valve member 72 communicating the second port 280b with the first port 280a while closing the third port 280c. At the same time, the pre-exterior device switching unit 28a is set in the opening side switching state due to the second valve member 74 communicating the fourth port 280d with the fifth port 280e while closing the sixth port 280f, thereby guiding the refrigerant discharged from the compressor 11 to flow into the exterior heat exchanger 16 without passing through the fixed decompression valve 61. FIG. 11 shows the integrated valve 28 in this state.

Conversely, the passage switching unit 28b may be switched to the bypass state while the pre-exterior device switching unit 28a may be switched to the decompression side switching state. Specifically, the passage switching unit 28b is set in the bypass state by closing the second port 280b while communicating the third port 280c with the first port 280a. At the same time, the pre-exterior device switching unit 28a is set in the decompression side switching state due to the second valve member 74 closing the fifth port 280e while communicating the fourth port 280d with the sixth port 280f, thereby guiding the refrigerant discharged from the compressor 11 to be decompressed by the fixed decompression valve 61 and then flow into the exterior heat exchanger 16. In other words, by selectively allowing the refrigerant to flow to the fixed decompression valve 61, the pre-exterior device switching unit 28a of the integrated valve 28 is able to switch whether or not the pressure of the refrigerant flowing into the exterior heat exchanger 16 is decompressed with respect to the discharge pressure of the compressor 11.

In the refrigeration cycle device 10 configured in this manner as well, the integrated valve 28 operates in the same manner as the first embodiment. In other words, at step S03 of FIG. 4, due to the operation of the actuator 761 of the integrated valve 28, the passage switching unit 28b may be switched to the bypass state while the pre-exterior device switching unit 28a may be switched to the decompression side switching state.

Due to this, the first refrigerant circuit is set in the heat pump circuit 101, and refrigerant circulates as shown by the arrows FLc in FIG. 10. In other words, in the first refrigerant circuit, refrigerant flows, in order, from the discharge port 112 of the compressor 11, to the fourth port 280d of the integrated valve 28, the fifth port 280e of the integrated valve 28, the exterior heat exchanger 16, the gas-liquid separator 17, the subcooling device 19, the pre-evaporator decompression unit 291 of the thermal expansion valve 29, the evaporator 22, the thermosensitive unit 292 of the thermal expansion valve 29, the second port 280b of the integrated valve 28, the first port 280a of the integrated valve 28, and then to the suction port 111 of the compressor 11.

Conversely, at step S05 of FIG. 4, due to the operation of the actuator 761 of the integrated valve 28, the passage switching unit 28b may be switched to the bypass state while the pre-exterior device switching unit 28a may be switched to the decompression side switching state.

Due to this, the second refrigerant circuit is set in the heat pump circuit 101, and refrigerant circulates as shown by the arrows FLh in FIG. 10. In other words, in the second refrigerant circuit, refrigerant flows, in order, from the discharge port 112 of the compressor 11, to the fourth port 280d of the integrated valve 28, the sixth port 280f of the integrated valve 28, the interior condenser 12, the fixed decompression valve 61, the exterior heat exchanger 16, the gas-liquid separator 17, the third port 280c of the integrated valve 28, the first port 280a of the integrated valve 28, and then to the suction port 111 of the compressor 11.

According to the present embodiment, due to the configurations which are common with the first embodiment described previously, the same effects as the first embodiment may be exhibited. Further, according to the present embodiment, since the heat pump circuit 101 includes the fixed decompression valve 61, which decompresses the refrigerant flowing out of the exterior heat exchanger 16, separately from the integrated valve 28, there is an advantage in that it is not necessary for the integrated valve 28 to have a decompression function of decompressing refrigerant.

Sixth Embodiment

A sixth embodiment of the present disclosure will be described. In the present embodiment, mainly features that are different from the fifth embodiment will be described.

Figure 12:
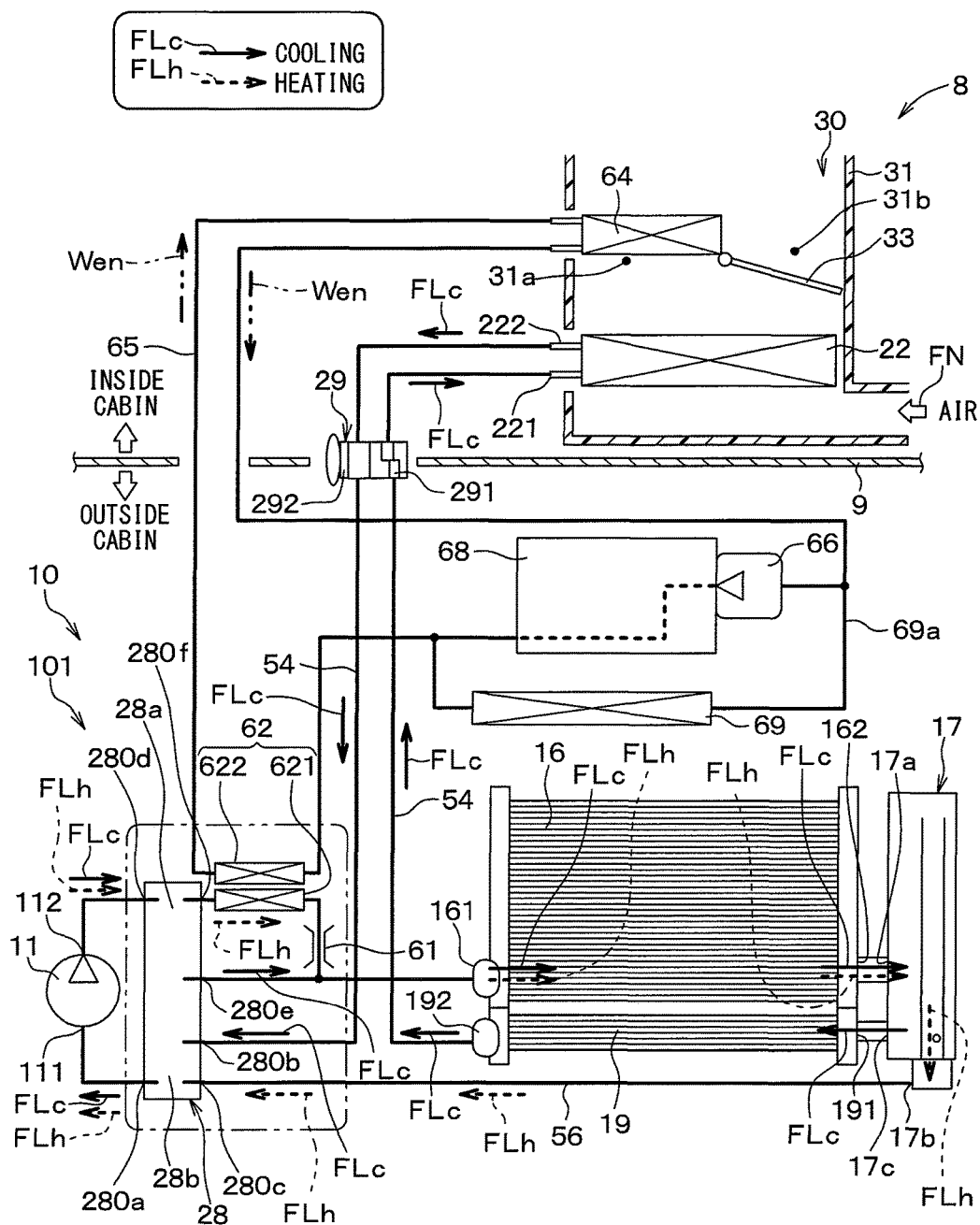
FIG. 12 is an overview configuration diagram of a vehicle air conditioner according to a sixth embodiment, and corresponds to FIG. 10 of the fifth embodiment.

FIG. 12 is an overall configuration diagram of a vehicle air conditioner 8 according to the present embodiment, and corresponds to FIG. 10 in the fifth embodiment. As shown in FIG. 12, in the present embodiment, instead of the interior condenser 12 of the fifth embodiment, a water-cooled condenser 62 is provided, and a heater core 64 is disposed in the warm air passage 31a of the interior air conditioning unit 30. The present embodiment differs from the fifth embodiment in these points.

The water-cooled condenser 62 is a well known water cooled refrigerant heat exchanger, and includes a first heat exchange unit 621 in which refrigerant flows, and a second heat exchange unit 622 in which antifreeze, which is used as engine coolant, flows. The first heat exchange unit 621 is disposed between the sixth port 280f of the integrated valve 28 and the fixed decompression valve 61. The second heat exchange unit 622 is disposed in an antifreeze circulation circuit 65 in which antifreeze flows.

In the antifreeze circulation circuit 65, an antifreeze, which is a liquid heat exchanging medium, is circulated by a coolant pump 66 as shown by the arrows Wen. The second heat exchange unit 622 is disposed in series with the heater core 64 such that the antifreeze flowing out from the second heat exchange unit 622 passes through the heater core 64 to return to an engine 68. Further, the antifreeze circulation circuit 65 is provided in parallel with a radiator circuit 69a in which antifreeze circulates between the engine 68 and a vehicle radiator 69. The engine 68 is a propulsion power source of the vehicle.

The water-cooled condenser 62, configured as described above, exchanges heat between the refrigerant flowing in the first heat exchange unit 621 with the antifreeze flowing in the second heat exchange unit 622, thereby heating the antifreeze with the heat from the refrigerant, as well as cooling the refrigerant. However, in the same manner as the interior condenser 12 of the fifth embodiment described above, due to the integrated valve 28 being switched, refrigerant does not flow into the first heat exchange unit 621 of the water-cooled condenser 62 when the first refrigerant circuit is set, and refrigerant does flow into the first heat exchange unit 621 of the water-cooled condenser 62 when the second refrigerant circuit is set.

The heater core 64 is disposed within the housing 31 of the interior air conditioning unit 30 at the same position as the interior condenser 12 of the fifth embodiment. In other words, the heater core 64 is disposed in the warm air passage 31a. The heater core 64 exchanges heat between the antifreeze flowing inside the heater core 64 and the ventilation air passing through the heater core 64 in the warm air passage 31a. Accordingly, the water-cooled condenser 62 functions as a heat dissipater which indirectly dissipates the heat held by the refrigerant which is discharged from the compressor 11 and flows into the first heat exchange unit 621 to the ventilation air by way of the heater core 64.

According to the present embodiment, due to the configurations which are common with the fifth embodiment described previously, the same effects as the fifth embodiment may be exhibited. Further, the integrated valve 28, the water-cooled condenser 62, and the fixed decompression valve 61 of the present embodiment may be integrated with bolts or the like. Further, while the present embodiment is a modification based on the fifth embodiment, the present embodiment may be combined with the first to fourth embodiments as well.

Seventh Embodiment

A seventh embodiment of the present disclosure will be described. In the present embodiment, mainly features that are different from the sixth embodiment will be described.

Figure 13:
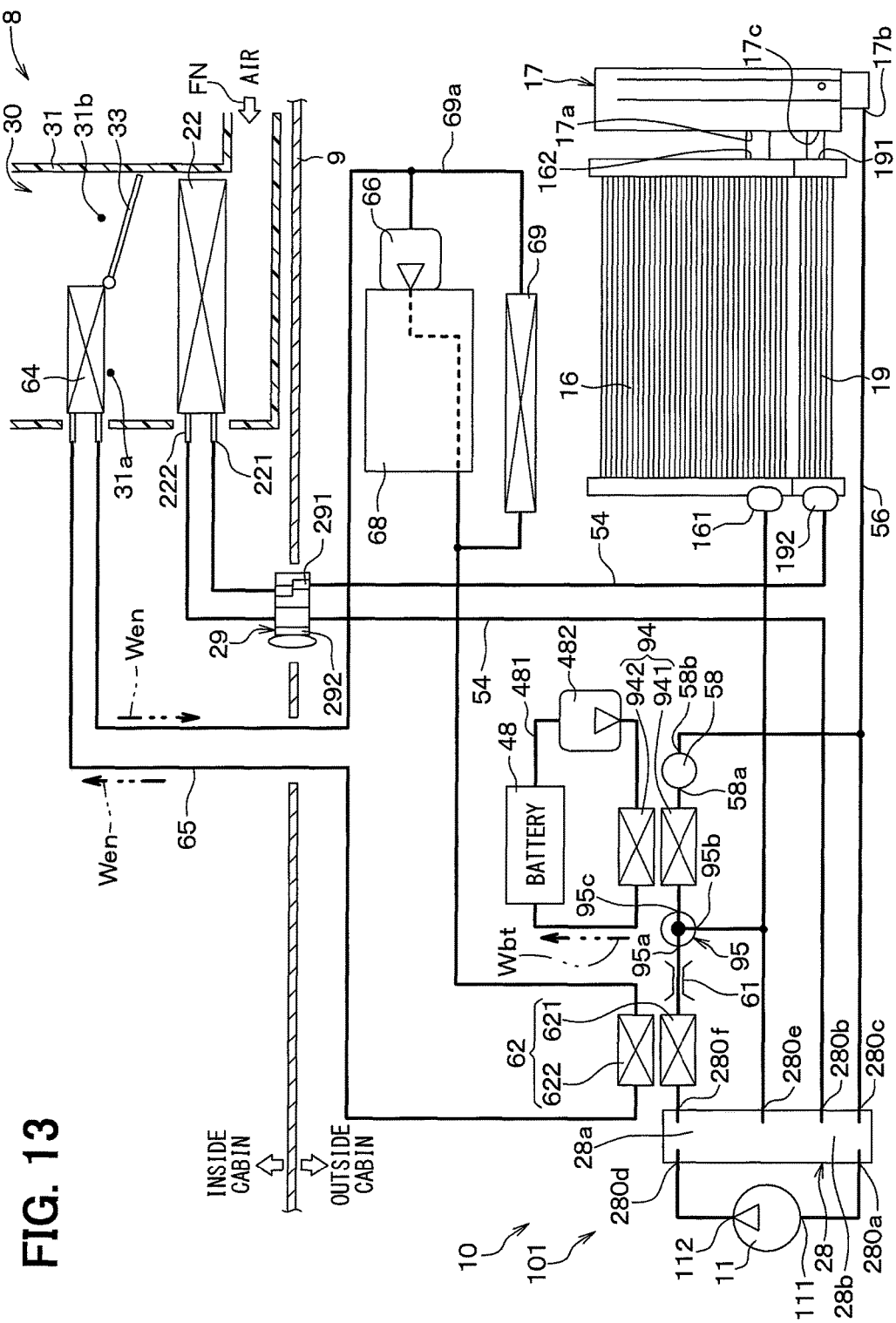
FIG. 13 is an overview configuration diagram of a vehicle air conditioner according to a seventh embodiment, and corresponds to FIG. 12 of the sixth embodiment.

FIG. 13 is an overall configuration diagram of a vehicle air conditioner 8 according to the present embodiment, and corresponds to FIG. 12 in the sixth embodiment. As shown in FIG. 13, in the present embodiment, the heat pump circuit 101 includes a water-refrigerant heat exchanger 94, the accumulator 58, and a switching valve 95. The present embodiment differs from the sixth embodiment in these points.

The water-refrigerant heat exchanger 94 is a heat exchanger with the same structure as the water-cooled condenser 62, and includes a refrigerant evaporator 941 in which refrigerant flows, and a liquid cooling unit 942 in which antifreeze flows. The refrigerant evaporator 941 functions as an evaporator that evaporates refrigerant, and is disposed on the refrigerant flow downstream side of the fixed decompression valve 61 as well as the refrigerant flow upstream side of the accumulator 58. The liquid cooling unit 942 is provided in a battery coolant circuit 481 in which antifreezes flows.

In the battery coolant circuit 481, an antifreeze, which for example may be the same as the antifreeze which circulates in the antifreeze circulation circuit 65, is circulated by a circulation pump 482 as shown by the arrows Wbt. The antifreeze discharged by the circulation pump 482 flows into the liquid cooling unit 942 of the water-refrigerant heat exchanger 94. In the battery coolant circuit 481, the liquid cooling unit 942 is disposed in series with the battery 48 such that the antifreeze flowing out from the liquid cooling unit 942 passes through the battery 48 and then returns to the circulation pump 482.

The water-refrigerant heat exchanger 94, with the above described structure, exchanges heat between the refrigerant flowing in the refrigerant evaporator 941 and the antifreeze flowing in the liquid cooling unit 942 when refrigerant is guided to flow to the refrigerant evaporator 941. Due to this, the water-refrigerant heat exchanger 94 causes the refrigerant to evaporate and vaporize with the heat of the antifreeze, and also cools the antifreeze.

The accumulator 58 is disposed in the heat pump circuit 101 between the refrigerant evaporator 941 of the water-refrigerant heat exchanger 94 and the third port 280c of the integrated valve 28. In other words, refrigerant which has been heat exchanged in the refrigerant evaporator 941 of the water-refrigerant heat exchanger 94 flows into the accumulator 58, and among that flowed in refrigerant, mainly gas-phase refrigerant is flowed out to the third port 280c of the integrated valve 28.

The switching valve 95 is an electric three-way valve that includes an inlet port 95a, a first outlet port 95b, and a second outlet port 95c. More specifically, based on a control signal from the ECU 50, the switching valve 95 selectively connects the input port 95a to one of the first outlet port 95b or the second outlet port 95c. Along with this, the switching valve 95 closes whichever of the first outlet port 95b or the second outlet port 95c to which the inlet port 95a is not connected.

Specifically, the inlet port 95a of the switching valve 95 is connected to the refrigerant outlet of the fixed decompression valve 61, the first outlet port 95b is connected to the refrigerant inlet 161 of the exterior heat exchanger 16, and the second outlet port 95c is connected to the refrigerant inlet of the refrigerant evaporator 941 of the water-refrigerant heat exchanger 94.

Figure 14:
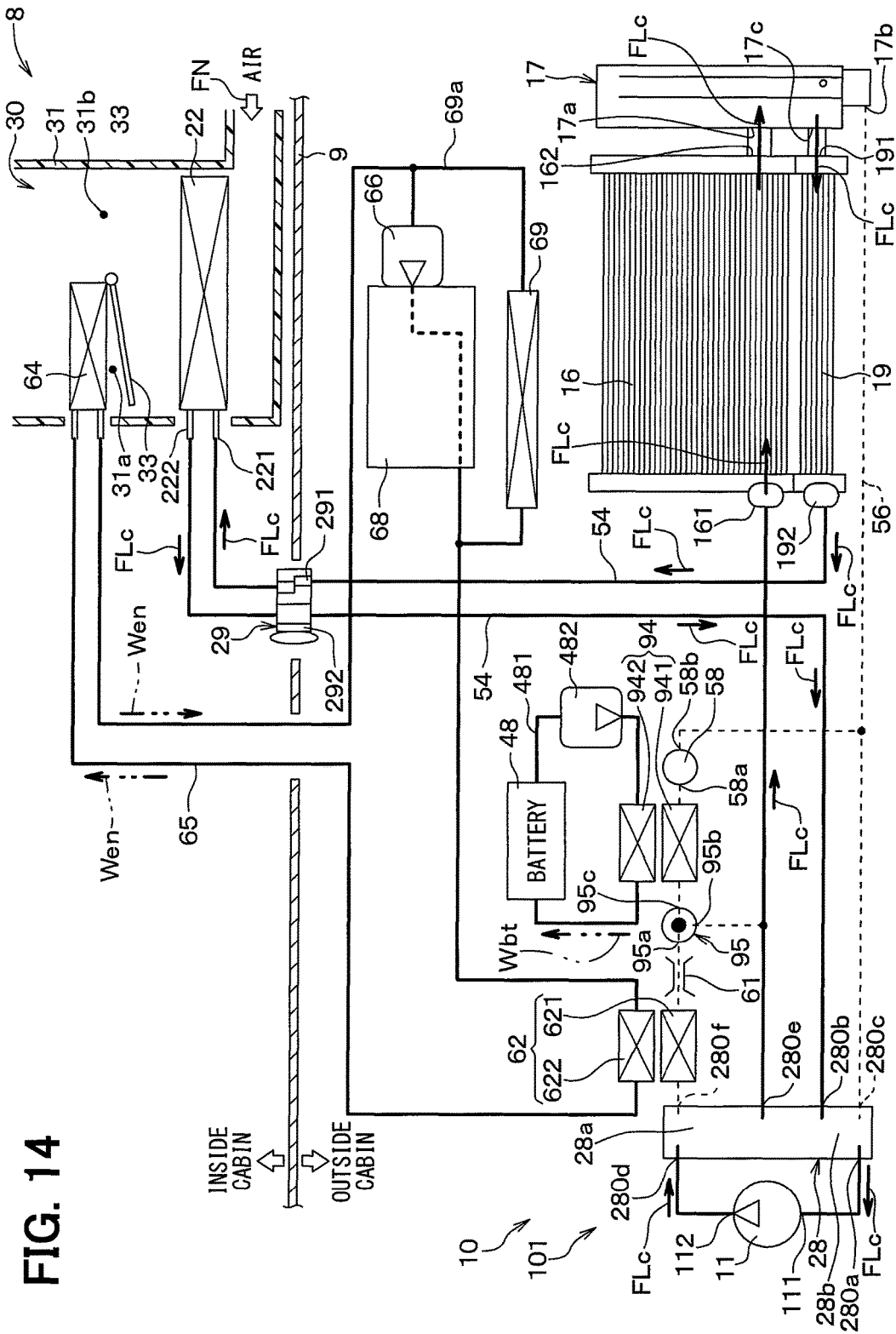
FIG. 14 is a view that shows passages in which refrigerant flows with solid lines and shows passages in which refrigerant does not flow with dashed lines when a first refrigerant circuit is set in the overview diagram of FIG. 13.

In the refrigeration cycle device 10 configured in this manner as well, the integrated valve 28 operates in the same manner as the sixth embodiment. In other words, at step S03 of FIG. 4, due to the operation of the actuator 761 of the integrated valve 28 in the heat pump circuit 101, the first refrigerant circuit may be set. Then, in the first refrigerant circuit, similar to the sixth embodiment, refrigerant is circulated along the refrigerant path shown by solid lines in FIG. 14. FIG. 14 shows the paths in which refrigerant flows when the first refrigerant circuit is set as solid lines, and shows paths in which refrigerant does not flow as dashed lines Specifically, as shown by the arrows FLc in FIG. 14, in the first refrigerant circuit, refrigerant flows, in order, from the discharge port 112 of the compressor 11, to the fourth port 280d of the integrated valve 28, the fifth port 280e of the integrated valve 28, the exterior heat exchanger 16, the gas-liquid separator 17, the subcooling device 19, the pre-evaporator decompression unit 291 of the thermal expansion valve 29, the evaporator 22, the thermosensitive unit 292 of the thermal expansion valve 29, the second port 280b of the integrated valve 28, the first port 280a of the integrated valve 28, and then to the suction port 111 of the compressor 11.

Figure 15:
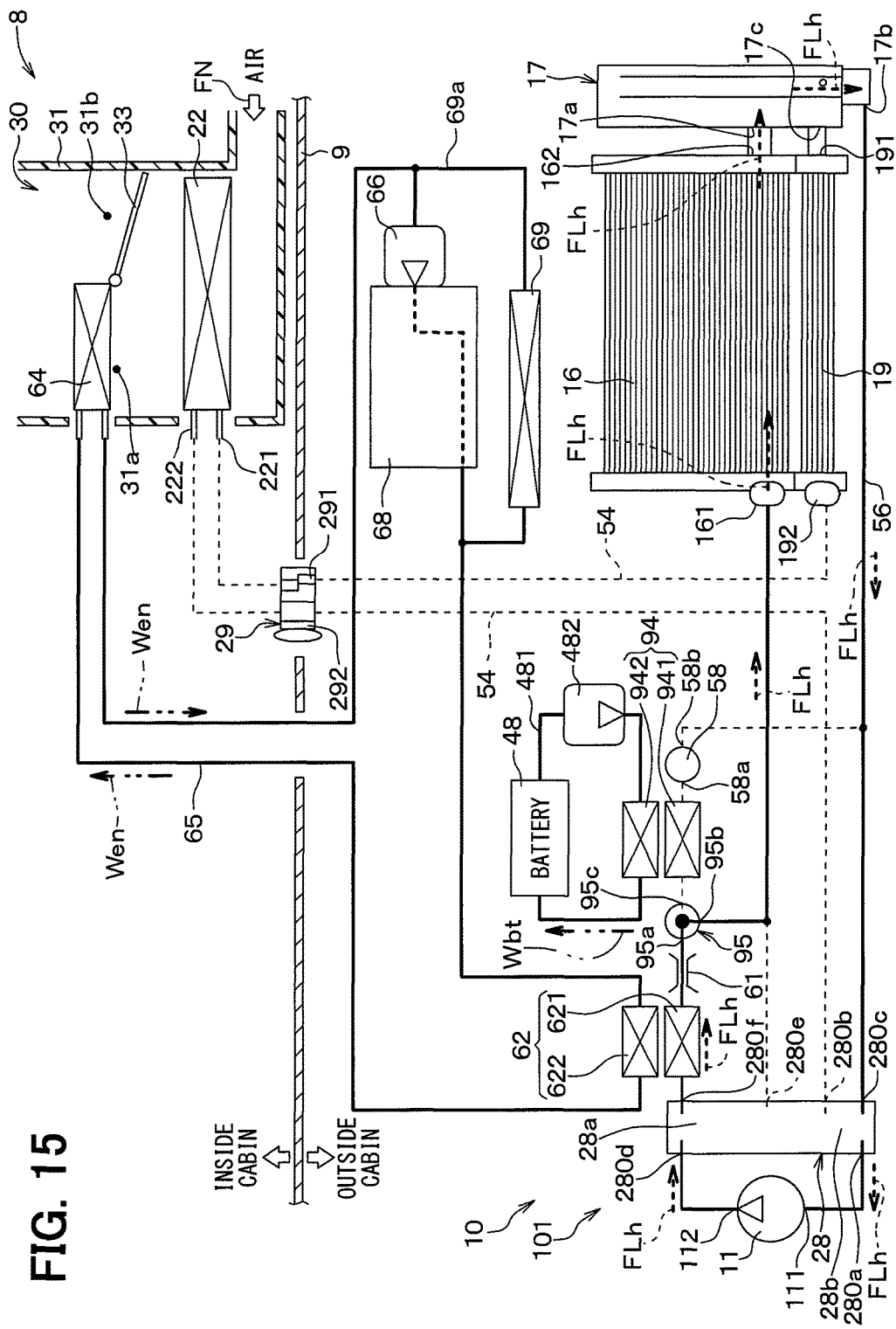
FIG. 15 is a view that shows passages in which refrigerant flows with solid lines and shows passages in which refrigerant does not flow with dashed lines when a second refrigerant circuit is set in the overview diagram of FIG. 13.

Conversely, at step S05 of FIG. 4, due to the operation of the actuator 761 of the integrated valve 28 in the heat pump circuit 101, the second refrigerant circuit is set. When this second refrigerant circuit is set, the switching valve 95 connects the inlet port 95a with the first outlet port 95b while closing the second outlet port 95c Then, in the second refrigerant circuit, similar to the sixth embodiment, refrigerant is circulated along the refrigerant path shown by solid lines in FIG. 15. FIG. 15 shows the paths in which refrigerant flows when the second refrigerant circuit is set as solid lines, and shows paths in which refrigerant does not flow as dashed lines Specifically, as shown by the arrows FLh in FIG. 15, in the second refrigerant circuit, refrigerant flows, in order, from the discharge port 112 of the compressor 11, to the fourth port 280d of the integrated valve 28, the sixth port 280f of the integrated valve 28, first heat exchange unit 621 of the water-cooled condenser 62, the fixed decompression valve 61, the switching valve 95, the exterior heat exchanger 16, the gas-liquid separator 17, the third port 280c of the integrated valve 28, the first port 280a of the integrated valve 28, and then to the suction port 111 of the compressor 11.

Figure 16:
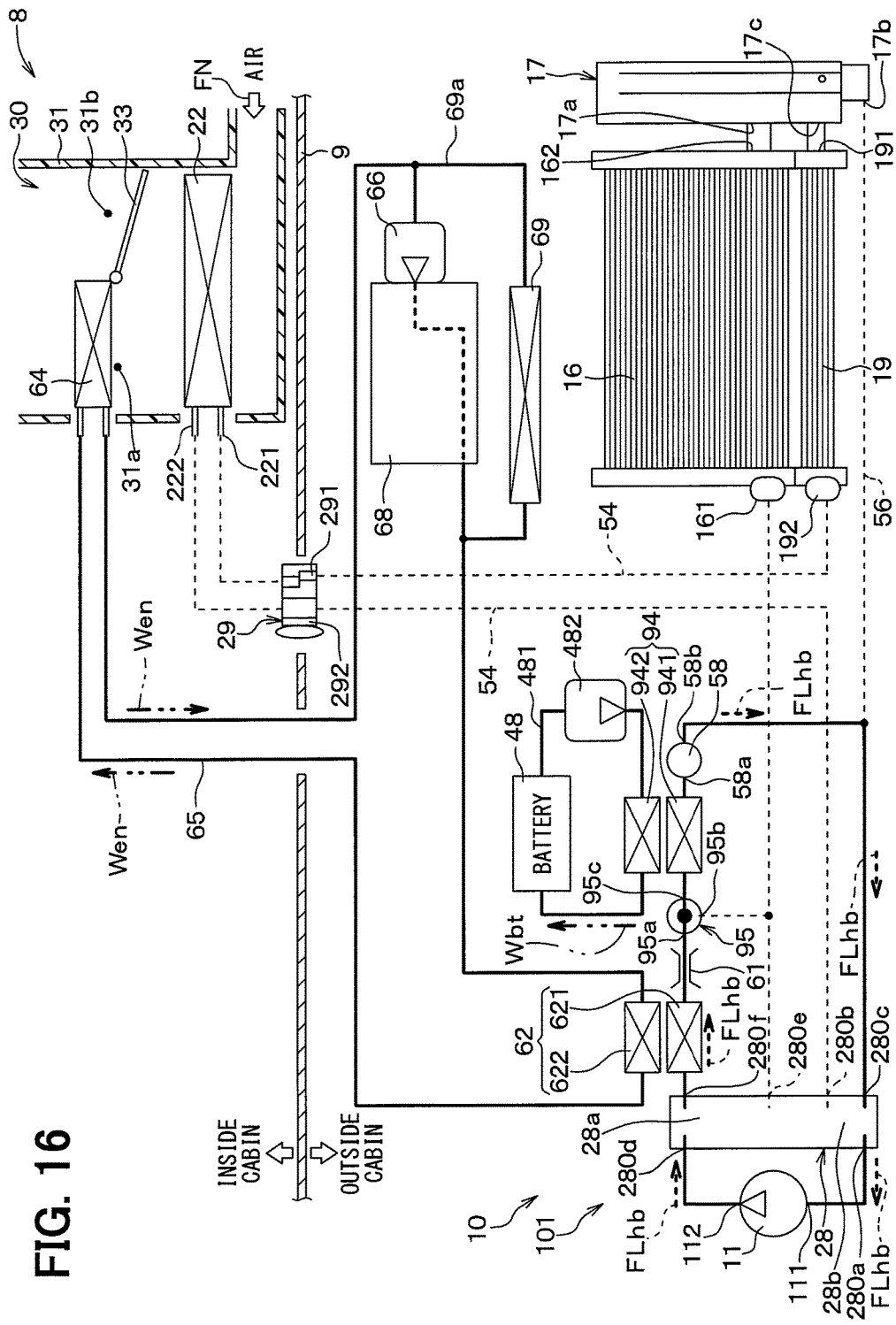
FIG. 16 is a view that shows passages in which refrigerant flows with solid lines and shows passages in which refrigerant does not flow with dashed lines when a third refrigerant circuit is set in the overview diagram of FIG. 13.

Further, as step S05 of FIG. 4, when it is necessary to cool the battery 48 in the refrigeration cycle device 10, the ECU 50 absorbs heat into the refrigerant at the refrigerant evaporator 941 of the water-refrigerant heat exchanger 94 instead of the exterior heat exchanger 16. For this reason, while the valve position of the integrated valve 28 is set in the second refrigerant circuit, the ECU 50 switches the switching valve 95 to close the first outlet port 95b and to communicate the inlet port 95a with the second outlet port 95c. Due to this, a third refrigerant circuit is set, in which refrigerant is circulated along the refrigerant path shown by solid lines in FIG. 16. FIG. 16 shows the paths in which refrigerant flows when the third refrigerant circuit is set as solid lines, and shows paths in which refrigerant does not flow as dashed lines Specifically, as shown by the arrows FLhb in FIG. 16, in the third refrigerant circuit, refrigerant flows, in order, from the discharge port 112 of the compressor 11, to the fourth port 280d of the integrated valve 28, the sixth port 280f of the integrated valve 28, first heat exchange unit 621 of the water-cooled condenser 62, the fixed decompression valve 61, the switching valve 95, the refrigerant evaporator 941 of the water-refrigerant heat exchanger 94, the accumulator 58, the third port 280c of the integrated valve 28, the first port 280a of the integrated valve 28, and then to the suction port 111 of the compressor 11.

Due to the refrigerant circulating in this third refrigerant circuit, the heat of the battery 48 is used to heat the ventilation air into the vehicle cabin, and the vehicle cabin may be heated. At the same time, the battery 48 may be cooled.

According to the present embodiment, due to the configurations which are common with the sixth embodiment described previously, the same effects as the sixth embodiment may be exhibited. Further, while the present embodiment is a modification based on the sixth embodiment, the present embodiment may be combined with the first to fifth embodiments as well.

Other Embodiments (1) In the above described first embodiment, an example is provided in which the passage communication hole 703a, which is defined in the third valve seat 703 that abuts and separates from the second valve member 74, is in communication with the second outlet passage 285 from among the third inlet passage 283 and the second outlet passage 285. However, the passage communication hole 703*a* may be in communication with the third inlet passage 283 instead of with the second outlet passage 285. That is, the passage communication hole 703*a* may be in communication with one side passage which is either one of the third inlet passage 283 and the second outlet passage 285.

(2) In the above described embodiments, an example is provided in which the sealing member 84 is mounted to the insert hole 70*a* of the body 70. However, the sealing member 84 may be omitted.

(3) In the above described embodiments, an example is provided in which the integrated valve 28 has the actuator 761 as a part of the valve driving member 76. However, instead of including the actuator 761, for example, the driving shaft 763 may be operated by an actuator that is provided outside of the integrated valve 28.

(4) In the above described embodiments, an example is provided in which the air passage switching door 33 of the interior air conditioning unit 30 is rotated to the first door position or the second door position. However, for example, the air passage switching door 33 may be positioned at an intermediate position instead of the first position and the second position.

(5) In the above described embodiments, an example is provided in which, the compressor 11 is an electric compressor. However, the compressor 11 may be a belt-driven compressor that is connected to the engine through a belt and is operated by a power generated by the engine.

(6) In the above described sixth and seventh embodiments, an example is provided in which the engine 68 functions as a heating heat source which heats the antifreeze circulating in the antifreeze circulation circuit 65 However, the antifreeze may be heated by a heating heat source other than the engine 68, such as an electric heater or the like. Alternatively, the antifreeze flowing to the heater core 64 may be not heated by the engine 68 or an electric heater or the like, and merely heated in the water-cooled condenser 62 instead.

(7) In the above described second embodiment, an example is provided in which the heat pump circuit 101 includes the accumulator 58, but instead of the accumulator 58, a gas-liquid separator may be included as a so-called receiver, into which refrigerant from the interior condenser 12 flows, and from which refrigerant flows into the third inlet passage 283 of the integrated valve 28.

(8) In the above described first and third to seventh embodiments, an example is provided in which the heat pump circuit 101 includes the thermal expansion valve 29, but instead of the thermal expansion valve 29, and electric expansion valve whose opening degree is electrically controlled may be provided instead. The same applies to the second thermal expansion valve 93 of the fourth embodiment.

(9) Each processing operated at each step of the flowchart shown in FIG. 4 is exerted by a computer program according to the above-described embodiments, however may be formed of a hard logic.

The present disclosure is not limited to the above-described embodiments. The present disclosure includes various modifications and changes within a scope of the present embodiment. Further, each of the above described embodiments may be combined with each other as appropriate, excepting obviously improper combinations. In the above-described embodiments, it is to be understood that elements constituting the embodiments are not necessary except for a case of being explicitly specified to be necessary and a case of being considered to be absolutely necessary in principle. Even when a factor such as a quantity of elements, a value, an amount, a range is mentioned in the above-described embodiments, it is to be understood that the factor is not limited to a specific value except for a case of being explicitly specified to be necessary and a case of being considered to be absolutely necessary in principle. Even when a feature such as a material forming a member, a shape of a member, a positional relation of members, it is to be understood that such feature is not limited to a specific material, shape, positional relation, or the like except for a case of being explicitly specified to be necessary and a case of being considered to be absolutely necessary in principle.

What is claimed is:

1. A refrigeration cycle device, comprising:
   a compressor that includes a suction port and a discharge port, the compressor sucking in refrigerant from the suction port, compresses the refrigerant, and then discharges the compressed refrigerant from the discharge port;
   a heat dissipater, the refrigerant which flowed out from the compressor flowing into the heat dissipater, the heat dissipater dissipating heat held by the refrigerant to ventilation air toward an air conditioning target space;
   an exterior heat exchanger, the refrigerant that flowed out from the compressor flowing into the exterior heat exchanger, the exterior heat exchanger exchanging heat between the refrigerant and outside air;
   a pre-exterior device switching unit disposed in a refrigerant passage from the compressor to the exterior heat exchanger, the pre-exterior device switching unit being switched between an opening side switching state that guides the refrigerant to flow from the compressor to the exterior heat exchanger, and a decompression side switching state that guides the refrigerant to flow from the compressor to the heat dissipater and guides the refrigerant, which is decompressed to a greater degree than in the open side switching state after flowing out from the heat dissipater, to flow to the exterior heat exchanger;
   a pre-evaporator decompression unit that decompresses the refrigerant which flowed out from the exterior heat exchanger;
   an evaporator that exchanges heat between the refrigerant which flowed out from the pre-evaporator decompression unit and the ventilation air to evaporate the refrigerant;
   an evaporator passage that guides the refrigerant which flowed out from the exterior heat exchanger to the suction port of the compressor while passing through the pre-evaporator decompression unit and the evaporator;
   a bypass passage that guides the refrigerant which flowed out from the exterior heat exchanger to the suction port of the compressor while bypassing the pre-evaporator decompression unit and the evaporator;
   a passage switching unit that opens and closes the bypass passage, the passage switching unit being set in a non-bypass state that closes the bypass passage while the evaporator passage is open, and being set in a bypass state that opens the bypass passage while the evaporator passage is closed, wherein
   the pre-exterior device switching unit and the passage switching unit form a coupled valve where the pre-exterior device switching unit and the passage switching unit are mechanically coupled, and in the coupled valve, the passage switching unit is set in the non-bypass state together with the pre-exterior device switching unit being switched to the opening side switching state, and the passage switching unit is set in the bypass state together with the pre-exterior device switching unit being switched to the decompression side switching state.

2. The refrigeration cycle device of claim 1, further comprising:

a gas-liquid separator interposed between the exterior heat exchanger and both the evaporator passage and the bypass passage, the gas-liquid separator separating the refrigerant that flowed out of the exterior heat exchanger into a gas-phase refrigerant and a liquid-phase refrigerant, the gas-liquid separator including a gas-phase refrigerant outlet that allows the gas-phase refrigerant to flow out to the bypass passage and a liquid-phase refrigerant outlet that allows the liquid-phase refrigerant to flow out to the evaporator passage.

3. The refrigeration cycle device of claim 2, wherein the coupled valve includes a first valve member as a valve body of the passage switching unit, a second valve member as a valve body of the pre-exterior device switching unit, a rod member couples to both the first valve member and the second valve member, and a body that houses the first valve member and the second valve member, the pre-exterior device switching unit and the passage switching unit are mechanically coupled through the rod member, a first inlet passage connected to a refrigerant flow downstream side of the evaporator passage, a second inlet passage connected to a refrigerant flow downstream side of the bypass passage, a third inlet passage connected to the heat dissipater, a first outlet passage connected to the suction port of the compressor, and a second outlet passage connected to the exterior heat exchanger, are formed in the body, the body includes a valve seat which forms a passage communication hole connected to one side passage, the one side passage being one of the third inlet passage or the second outlet passage, a throttle hole is formed in the second valve body, the throttle hole penetrating through the second valve body, the passage switching unit is set in the non-bypass state by the first valve member communicating the first inlet passage with the first outlet passage while closing the second inlet passage, and set in the bypass state by the first valve member closing the first inlet passage while communicating the second inlet passage with the first outlet passage, the pre-exterior device switching unit is set in the opening side switching state by the second valve member separating from the valve seat, and set in the decompression side switching state by the second valve member abutting on the valve seat and the refrigerant from the third inlet passage being allowed to pass through the throttle hole.

4. The refrigeration cycle device of claim 2, further comprising:

a pre-exterior device decompression unit disposed in a refrigerant passage from the heat dissipater to the exterior heat exchanger, the pre-exterior device decompression unit decompressing the refrigerant that flowed out from the heat dissipater, wherein the coupled valve includes a first valve member as a valve body of the passage switching unit, a second valve member as a valve body of the pre-exterior device switching unit, a rod member couples to both the first valve member and the second valve member, and a body that houses the first valve member and the second valve member, the pre-exterior device switching unit and the passage switching unit are mechanically coupled through the rod member, a first port connected to the suction port of the compressor, a second port connected to a refrigerant flow downstream side of the evaporator passage, a third port connected to a refrigerant flow downstream side of the bypass passage, a fourth port connected to the discharge port of the compressor, a fifth port connected to the exterior heat exchanger bypassing the heat dissipater and the pre-exterior device decompression unit, and a sixth port connected to the heat dissipater, are formed in the body, the passage switching unit is set in the non-bypass state by the first valve member communicating the second port with the first port while closing the third port, and set in the bypass state by the first valve member closing the second port while communicating the third port with the first port, the pre-exterior device switching unit is set in the opening side switching state by the second valve member communicating the fourth port with the fifth port while closing the sixth port, and set in the decompression side switching state by the second valve member closing the fifth port while communicating the fourth port with the sixth port.

5. The refrigeration cycle device of claim 1, wherein the passage switching unit opens and closes the bypass passage and also opens and closes the evaporator passage, the passage switching unit closing the bypass passage and opening the evaporator passage in the non-bypass state, and opening the bypass passage and closing the evaporator passage in the bypass state.

6. The refrigeration cycle device of claim 1, wherein the coupled valve includes a first valve member as a valve body of the passage switching unit, a second valve member as a valve body of the pre-exterior device switching unit, and a rod member coupled to both the first valve member and the second valve member, and the pre-exterior device switching unit and the passage switching unit are mechanically coupled through the rod member.

7. The refrigeration cycle device of claim 1, wherein the pre-exterior device switching unit:

in the opening side switching state, guides the refrigerant at a refrigerant inlet of the exterior heat exchanger, which is set to a pressure so as to reach a higher temperature than outside air, to flow into the exterior heat exchanger, and in the decompression side switching state, guides the refrigerant at the refrigerant inlet of the exterior heat exchanger, which is decompressed to a pressure so as to reach a lower temperature than outside air, to flow into the exterior heat exchanger.

8. A refrigeration cycle device, comprising:

a compressor that includes a suction port and a discharge port, the compressor sucking in refrigerant from the suction port, compresses the refrigerant, and then discharges the compressed refrigerant from the discharge port;

a heat dissipater, the refrigerant which flowed out from the compressor flowing into the heat dissipater, the heat dissipater dissipating heat held by the refrigerant to ventilation air toward an air conditioning target space;

an exterior heat exchanger, the refrigerant that flowed out from the compressor flowing into the exterior heat exchanger, the exterior heat exchanger exchanging heat between the refrigerant and outside air;

a pre-exterior device switching unit disposed in a refrigerant passage from the compressor to the exterior heat exchanger, the pre-exterior device switching unit being switched between an opening side switching state that guides the refrigerant to flow from the compressor to the exterior heat exchanger, and a decompression side switching state that guides the refrigerant to flow from the compressor to the heat dissipater and guides the refrigerant, which is decompressed to a greater degree than in the open side switching state after flowing out from the heat dissipater, to flow to the exterior heat exchanger;

a pre-evaporator decompression unit that decompresses the refrigerant which flowed out from the exterior heat exchanger;

an evaporator that exchanges heat between the refrigerant which flowed out from the pre-evaporator decompression unit and the ventilation air to evaporate the refrigerant;

an evaporator passage that guides the refrigerant which flowed out from the exterior heat exchanger to the suction port of the compressor while passing through the pre-evaporator decompression unit and the evaporator;

a bypass passage that guides the refrigerant which flowed out from the exterior heat exchanger to the suction port of the compressor while bypassing the pre-evaporator decompression unit and the evaporator;

a passage switching unit that opens and closes the bypass passage, the passage switching unit being switched between a non-bypass state that closes the bypass passage and a bypass state that opens the bypass passage; and an opening/closing valve that opens the evaporator passage when the passage switching unit is in the non-bypass state and that closes the evaporator passage when the passage switching unit is in the bypass state, wherein the pre-exterior device switching unit and the passage switching unit form a coupled valve where the pre-exterior device switching unit and the passage switching unit are mechanically coupled, and in the coupled valve, the passage switching unit is set in the non-bypass state together with the pre-exterior device switching unit being switched to the opening side switching state, and the passage switching unit is set in the bypass state together with the pre-exterior device switching unit being switched to the decompression side switching state.

9. The refrigeration cycle device of claim 8, wherein the pre-exterior device switching unit:

in the opening side switching state, guides the refrigerant at a refrigerant inlet of the exterior heat exchanger, which is set to a pressure so as to reach a higher temperature than outside air, to flow into the exterior heat exchanger, and in the decompression side switching state, guides the refrigerant at the refrigerant inlet of the exterior heat exchanger, which is decompressed to a pressure so as to reach a lower temperature than outside air, to flow into the exterior heat exchanger.

* * * * *